US009490948B2

United States Patent
Doken et al.

(10) Patent No.: US 9,490,948 B2
(45) Date of Patent: Nov. 8, 2016

(54) METHOD AND APPARATUS FOR VIDEO AWARE BANDWIDTH AGGREGATION AND/OR MANAGEMENT

(75) Inventors: Serhad Doken, Chester Springs, PA (US); Alexander Reznik, Titusville, NJ (US)

(73) Assignee: VID SCALE, Inc., Wilmington, DE (US)

( * ) Notice: Subject to any disclaimer, the term of this patent is extended or adjusted under 35 U.S.C. 154(b) by 168 days.

(21) Appl. No.: 14/128,490

(22) PCT Filed: Jun. 20, 2012

(86) PCT No.: PCT/US2012/043351
§ 371 (c)(1),
(2), (4) Date: May 5, 2014

(87) PCT Pub. No.: WO2012/177763
PCT Pub. Date: Dec. 27, 2012

(65) Prior Publication Data
US 2014/0313989 A1    Oct. 23, 2014

Related U.S. Application Data

(60) Provisional application No. 61/499,113, filed on Jun. 20, 2011.

(51) Int. Cl.
*H04L 5/00* (2006.01)
*H04L 29/06* (2006.01)
*H04N 21/647* (2011.01)
*H04W 28/02* (2009.01)

(52) U.S. Cl.
CPC ........... *H04L 5/0037* (2013.01); *H04L 65/605* (2013.01); *H04L 65/80* (2013.01); *H04N 21/64738* (2013.01); *H04N 21/64769* (2013.01); *H04W 28/0205* (2013.01); *H04L 65/607* (2013.01)

(58) Field of Classification Search
CPC combination set(s) only.
See application file for complete search history.

(56) References Cited

U.S. PATENT DOCUMENTS

2007/0268362 A1    11/2007    West et al.
2011/0055886 A1*   3/2011    Bennett ............... H04L 63/18
                                                         725/116

FOREIGN PATENT DOCUMENTS

WO    WO 2010/111150 A2    9/2010

OTHER PUBLICATIONS

Luo et al, Investigation of Radio Resource Scheduling in WLANs Coupled with 3G Cellular Network, IEEE, pp. 108-115, Jun. 2003.*
Ford, et al. "Architectural Guidelines for Multipath TCP Development", Request for Comments: 6182, Internet Engineering Task Force (IETF), Mar. 2011, 28 pages.

* cited by examiner

*Primary Examiner* — Frank Duong
(74) *Attorney, Agent, or Firm* — Condo Roccia Koptiw LLP

(57) ABSTRACT

A communication network's bandwidth may be managed using bandwidth management ("BWM") and/or bandwidth aggregation ("BWA") techniques. For example, packets of traffic may be inspected to identify a video stream and/or video sub-streams. The video sub-streams may be partitioned for transmission. For example, the video sub-streams may be partitioned based on a characteristic and/or policies associated therewith. One or more radio access technologies ("RATs") may be selected for transmitting the video sub-streams. The one or more RATs may be selected according to one or more policies for managing the bandwidth associated with the video. The video sub-streams may be transmitted via a single RAT or a plurality of aggregated RATs.

22 Claims, 14 Drawing Sheets

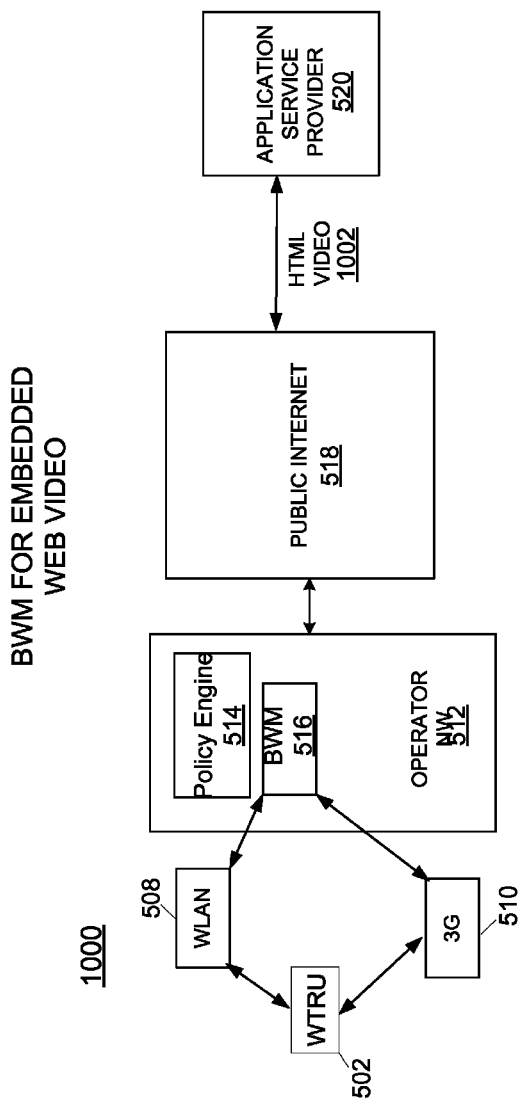

METHOD AND APPARATUS FOR VIDEO AWARE BANDWIDTH AGGREGATION AND/OR MANAGEMENT

CROSS-REFERENCE TO RELATED APPLICATIONS

This application is the 35 U.S.C. X371 National Stage of Patent Cooperation Treaty Application No. PCT/US2012/043351, filed Jun. 20, 2012, which claims the benefit of U.S. provisional application No. 61/499,113, filed on Jun. 20, 2011, which is incorporated by reference herein in its entirety.

BACKGROUND

Delivery of video content may use more bandwidth than voice, e-mail, web browsing and/or graphics. These other forms of data may be sent with or include embedded video. Video when packaged as a service, such as 2-way video or video conferencing for example, may have more bandwidth requirements, and/or more stringent real-time service and quality requirements, such as latency for example, which if not provided may render a whole service, or portions thereof, unacceptable and/or unusable. Thus, services and applications that include video content may benefit from a well-managed access to multiple radio-access means for delivery of such video traffic.

SUMMARY

Systems and methods are described herein for transmitting video in a mobile network using one or more radio access technologies (RATs). For example, packets of traffic may be inspected to identify a video stream. A plurality of video sub-streams may be identified in the video stream. The plurality of video sub-streams may be partitioned for transmission based on a characteristic associated with each sub-stream. One or more of the RATs may be selected for transmitting each sub-stream to meet a policy for managing a bandwidth associated with the sub-stream. The plurality of sub-streams may be transmitted using the plurality of RATs. For example, each sub-stream may be transmitted via the selected one or more of the plurality of RATs.

According to another embodiment, a BWM server may be configured to transmit video in a mobile network via a plurality of radio access technologies (RATs). The BWM server may include a traffic detection function, a processor, and/or a transmitter. The traffic detection function may be configured to inspect packets of traffic to identify a video stream and/or identify a plurality of video sub-streams in the video stream. The traffic detection function may also be configured to partition the plurality of video sub-streams for transmission based on a characteristic associated with each sub-stream. The processor may be configured to select a respective RAT of the plurality of RATs for transmitting each sub-stream to meet a policy for managing a bandwidth associated with the sub-stream. The transmitter may be configured to transmit each sub-stream of the plurality of sub-streams using its respective RAT of the plurality of RATs.

The embodiments described in the Summary are provided as examples, and are in no way limiting on the scope of the embodiments described elsewhere herein.

BRIEF DESCRIPTION OF THE DRAWINGS

A more detailed understanding may be had from the Detailed Description below, given by way of example in conjunction with drawings appended hereto. The FIGS. and the detailed description provide example embodiments and are not meant to be limiting.

FIG. 10 is a block diagram illustrating an example of BWM for embedded web video.

DETAILED DESCRIPTION

Systems, methods, and apparatuses are described herein that may intelligently deliver video to a WTRU over one or more radio access technologies ("RATs"). For example, embodiments are described for video-aware bandwidth management ("BWM") and/or bandwidth aggregation ("BWA"). BWM may be implemented where multiple radio-access technologies may be taken advantage of to increase the overall bandwidth available to user equipment ("UEs"). Video may be managed and/or delivered via a mobile network, using a plurality of RATs for example. The service capability may provide increased bandwidth compared to services using single radio layers. BWM may be performed by identifying one or more portions of video (e.g., sub-streams) and using the resources of one or more of the RATs for managing and/or transmitting the video content, or portions thereof. BWA may be one example of BWM, where two or more RATs may be used for simultaneous transmission. Other examples of BWM are further described herein.

Figure 1:
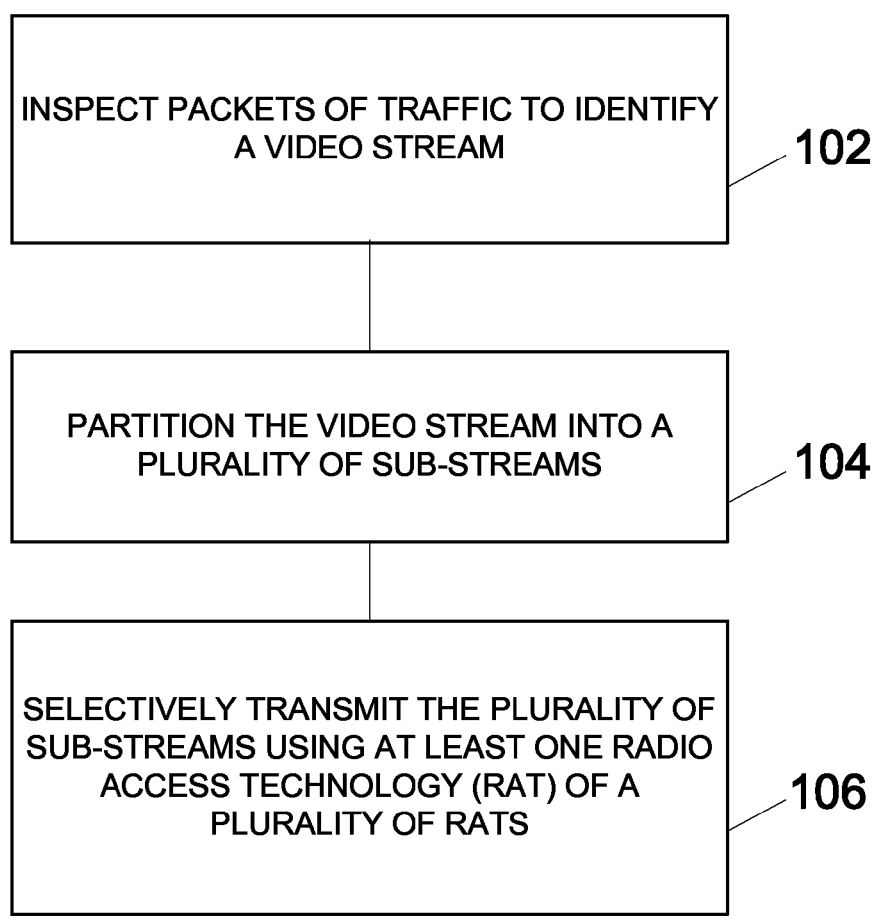
FIG. 1 is a flow diagram illustrating an example flow for managing video delivered via a mobile network using a plurality of radio access technologies ("RATs").

FIG. 1 is a flow diagram illustrating an example flow for managing video delivered via a mobile network using a plurality of RATs. The flow may be performed by a BWM entity (e.g., a BWM server) or other video management entity capable of performing the steps illustrated in the flow.

As shown in FIG. 1 at 102, packets of traffic may be inspected to identify a video stream. At 104, the video stream may be partitioned into a plurality of sub-streams. The sub-streams may be selectively transmitted at 106, using one or more RATs of the plurality of RATs for example. For example, one or more RATs may be selected for transmitting each sub-stream of the plurality of sub-streams. According to one example embodiment, the sub-streams of the received video stream may be transmitted via the plurality of RATs, where each RAT in the plurality may be a different RAT. Each RAT may include an RAT for Wi-Fi communication, cellular communication (e.g., 3G and/or LTE communication), Wi-MAX communication, and/or TVWS communication for example.

The sub-streams may be selectively transmitted at 106 by selecting a single sub-stream for transmission and transmitting the single sub-stream using one or more RATs (e.g., via BWM or BWA). As another example, selectively transmitting the plurality of sub-streams at 106 may be carried out by selecting a plurality of sub-streams and transmitting each sub-stream via a respective RAT. For example, a first and a second sub-stream may be selected for transmission. The first and second sub-streams may be transmitted using first and second respective RATs. The sub-streams may be sent over the separate RATs as described herein for example.

The sub-streams may include different characteristics and may be partitioned and/or transmitted according to the identified characteristics. One example of a characteristic of the sub-streams may include a type of picture frame. For example, a sub-stream may include intra-coded-picture frames ("I-frames"), predicted-picture frames ("P-frames"), and/or bi-predictive-picture frames ("B-frames"). The sub-streams may be partitioned and/or transmitted according to the type of picture frame associated with the sub-stream. According to an example embodiment, a video stream may include first, second, and/or third sub-streams. The first sub-stream may include I-frames, the second sub-stream may include P-frames, and/or the third sub-stream may include B-frames. Selectively transmitting the sub-streams at 106 may include selecting and transmitting one or more of the sub-streams using one or more RATs. For example, the first sub-stream (e.g., the I-frame sub-stream) may be selected and transmitted using one or more RATs. The second sub-stream (e.g., the P-frame sub-stream) and/or the third sub-stream (e.g., the B-frame sub-stream) may be selected and transmitted using one or more RATs. The RAT(s) used for transmitting the first sub-stream (e.g., the I-frame sub-stream) may be the same or different from the RAT(s) used for transmitting the second sub-stream (e.g., the P-frame sub-stream) and/or the third sub-stream (e.g., the B-frame sub-stream).

The plurality of RATs may collectively provide an aggregate bandwidth (e.g., which may be used for BWA). In such instances, selectively transmitting the sub-streams at 106 may include selectively transmitting the plurality of sub-streams based on an available aggregate bandwidth of the RATs. For example, one or more of the sub-streams may not be transmitted, or transmission may be delayed, if the available aggregate bandwidth may not support the sub-streams.

Other characteristics of video may be identified and/or video sub-streams may be partitioned and transmitted according to these characteristics. For example, the characteristics of the video may include an encoding of the video, one or more profiles of a video CODEC used to encode the video, start codes of a bitstream, Group of Pictures ("GOP"), GOP length, structure, the RTP payload format of the video stream, features used to encode the video (e.g., slicing scaling, etc. that may be as granular as at the macroblock level), and/or a priority associated with the video. Inspecting packets of traffic to identify a video stream at 102 may include inspecting packets of traffic to identify one or more characteristics of the video stream or a sub-stream. Partitioning the video stream at 104 may include partitioning the video stream into identified sub-streams as a function of one or more characteristics of the video. In these embodiments, selectively transmitting the plurality of sub-streams at 106 may include selectively transmitting the plurality of sub-streams using one or more RATs based on the one or more characteristics of the video sub-stream.

Examples of video CODECs used to encode a video may include a video CODEC defined in accordance with any of MPEG, H.263, H.264, H.264/AVC, scalable video coding ("SVC"), Multiview Video Coding ("MVC") extension, and/or H.265 protocols. The profiles may include any of a baseline profile, a main profile, a high profile, a constrained-baseline profile, an extended profile, a high-10 profile, a high-4:2:2 profile, a high-4:4:4-predictive profile, a high-10-intra profile, a high-4:2:2-intra profile, a high-4:4:4-intra profile, a CAVLC 4:4:4 intra profile, a scalable-baseline profile, a scalable-high profile, a scalable-high-intra profile, a stereo-high profile, and/or a multi-view-high profile for example. Each profile may refer to a set of capabilities that may target a specific video type and/or class of applications associated with the video. For example, some profiles may refer to high-definition video or high-cost applications that may use more bandwidth/resources and/or may have higher quality of service ("QoS") requirement, while other profiles may refer to standard-definition video or low-cost applications that may use less relative bandwidth and/or may have less QoS requirements. According to an example embodiment, for high definition video that may be transmitted over a network, a high profile may be implemented and/or for bandwidth constrained environments such as a cellular network (e.g., 3G and/or LTE) the base profile ("BP") encoding format may be implemented.

The plurality of RATs may include two or more RATs. One or more of the RATs may be capable of providing more bandwidth than one or more other RATs in the plurality. For example, the plurality of RATs may include a first RAT and a second RAT, where the first RAT may be capable of providing more bandwidth than the second RAT. In such embodiments, selectively transmitting the plurality of sub-streams at 106 may include selecting, based on the bandwidth and/or reliability of the first and second RATs, first and second sub-streams for transmission via the RATs, and transmitting the first and second sub-streams using the first and second RATs, respectively.

One or more of the RATs may adapt an air interface for communications using an unlicensed wireless spectrum. Additionally, or alternatively, one or more of the RATs may adapt the air interface for communications using a licensed wireless spectrum. According to an example embodiment, a first RAT may adapt an air interface for communications using the unlicensed wireless spectrum, while a second RAT may adapt the air interface for communications using the licensed wireless spectrum. The licensed wireless spectrum may include cellular and/or non-cellular licensed bands. The unlicensed wireless spectrum may include, for example, one or more frequencies of any of industrial, scientific, and medical ("ISM") radio frequency band, unlicensed national information infrastructure ("U-NII") radio frequency band, and/or television white space ("TVWS") spectrum.

Selectively transmitting the plurality of sub-streams at 106 may include a number of options described herein. For example, selectively transmitting the plurality of sub-streams at 106 may include selecting one or more RATs for transmitting the plurality of sub-streams. The RATs may be selected according to one or more policies, such as user defined policies, network operator policies, enterprise owner policies, and/or application policies for example. A policy owner may establish the one or more policies to route video sub-streams via the one or more RATs. For example, the one or more policies may be selected and/or established based on a service requirement, a certain level of QoS, a price or price range, a quality, a time of day, a type of video stream, a type of video content, and/or traffic congestion circumstances in the network (e.g., operator network) for example.

Selectively transmitting the plurality of sub-streams at 106 may include blocking transmission of one or more sub-streams of the plurality of sub-streams. The transmission may be blocked based on at least one policy or at least one constraint of the plurality of RATs for example. The sub-streams may be selectively transmitted at 106 using one or more subsets of the plurality of RATs. For example, the sub-streams may be selectively transmitted at 106 using a first subset of the plurality of RATs and other portions of the traffic may be selectively transmitted using a second subset of the plurality of RATs. According to an example embodiment, a video stream may be embedded in a web page (e.g., formed using HTML5 or another web-based format), and other portions of the traffic may include information for the web page. In such case, the plurality of sub-streams of the video content may be selectively transmitted at 106 using the first subset of the plurality of RATs, which may be capable of providing more bandwidth or reliability than the second subset for example, and/or the information for the web page may be selectively transmitted using the second subset of the plurality of RATs.

Another characteristic of video streams and/or video sub-streams may be the video encoding of the stream/sub-stream. For example, a video sub-stream may be identified, partitioned, and/or transmitted based on the video encoding of the sub-stream. Inspecting packets of traffic to identify a video stream at 102 may include inspecting packets of traffic to identify a video encoding of the video stream. Partitioning the video stream into a plurality of sub-streams at 104 may include partitioning the video stream into the sub-streams as a function of a structure of the video encoding.

The plurality of sub-streams may be associated with different priorities as described herein. For example, the plurality of sub-streams may include first and second sub-streams having respective priorities. The first priority may be greater than the second priority for example. In such instances, selectively transmitting the sub-streams at 106 may include transmitting the first and second sub-streams, via one or more RATs, according to their respective priorities. The respective priorities may correspond to a respective RAT(s). For example, the first sub-stream may have a first priority and may be transmitted via the first RAT, which may have greater relative bandwidth or reliability, while the second sub-stream may have a second priority and may be transmitted via a second RAT, which may have less relative bandwidth or reliability. BWA of one or more RATs may be determined based on a level of priority associated with a sub-stream. The priorities may be based on downlink and/or uplink implementations of a service providing the video stream. The priorities may be based on graduated levels of qualities of user experience, such as during playback of the video stream for example, where a sub-stream having a higher level of quality may be assigned a higher level of priority and a sub-stream having a lower level of quality may be assigned a lower level of priority.

Alternatively, or additionally, the priorities may be based on profiles of a video CODEC, such as any of the video CODECs described herein for example. The profiles may include, for example, any of a high profile, an extended profile, a scalable-baseline profile, a baseline profile, a main profile, a scalable-high profile, a scalable-high-intra profile, and/or another profile as described herein for example. According to an example embodiment, a first profile may include any of the high profile, the extended profile, the scalable-baseline profile, the scalable-high profile, the scalable-high-intra profile, or any other profile used for high-definition video or higher-cost applications and may be transmitted via a first RAT having more available bandwidth. A second profile may include any of the baseline profile, the main profile, or any other profile used for standard-definition or lower-cost applications and may be transmitted via a second RAT having less available bandwidth. The priority may be assigned to one or more profiles based on one or more policies. For example, according to one policy the first priority may be assigned to a profile associated with high-definition video or higher-cost applications (e.g., where delivering a high-quality resolution is given greater priority), while another policy may be used to assign the first priority to a profile associated with standard-definition video or low-cost applications (e.g., where delivering the service, regardless of the quality of resolution, is given greater priority).

According to an example embodiment, the sub-streams may include first, second, and/or third sub-streams having respective priorities. The first priority may be greater than the second and/or third priorities. In these instances, selectively transmitting the sub-streams at 106 may include: (i) transmitting the first sub-stream using a first RAT; and (ii) selectively transmitting the second and/or third sub-streams using a second and/or third RAT. The priority may be based on one or more characteristics (e.g., bandwidth) associated with the profile. The level of priority may be assigned differently based on one or more policies, service requirements, and/or QoS requirements.

The priorities may be based on profiles of the video CODEC. As described herein, each level of priority may be associated with a relatively higher or relatively lower quality profile. According to an example embodiment, the first profile may be any of a baseline profile or a scalable-high-intra profile; the second profile may be, for example, any of a main profile or a scalable-high profile; and the third profile may be, for example, any of a high profile, an extended profile, a scalable-baseline profile, or any other profile used for high-definition video or high-cost applications. While the first profile may be associated with the baseline profile (e.g., a relatively lower quality video profile), it may have a relatively higher priority than the second profile and/or the third profile since the transmission of the baseline profile video may enable a video service to be successfully provided to a video application. The transmission of other higher quality profiles may not independently allow a video service to be successfully provided to a user of a video application, but may provide a higher quality service. If there is more available bandwidth, other lower priority profiles (e.g., which may have a higher quality) such as the main profile and/or the high profile for example, may be transmitted via the one or more RATs. According to another example embodiment, the level of priority may be assigned to enable higher quality video profiles to be assigned a higher priority (e.g., where bandwidth may not be as much of a concern or where the baseline profile video has already been transmitted). For example, if a user is paying for a premium quality service, the high profile video stream may be given a higher priority for transmission on the RATs.

Inspecting packets of traffic to identify a video stream at 102 may include identifying the video stream as an adaptive video stream having first and second portions encoded in accordance with first and second formats, respectively. A replacement video stream may be requested and/or received, from a source of the video stream for example. The replacement video stream may have the first and/or second portions encoded in accordance with the first format (e.g., a non-adaptive video stream). Thus, partitioning the video stream into a plurality of sub-streams at 104 may include partitioning the replacement video stream into the plurality of sub-streams. Alternatively, a replacement portion may be requested, from the source of the video stream for example, to replace a portion (e.g., first or second portion) of the video stream. The replacement portion may be received, encoded in accordance with a video format (e.g., the first format), and/or used to replace the second portion.

Inspecting packets of traffic to identify a video stream at 102 may include identifying the video stream from video-call signaling information (e.g., signaling information associated with a two-way video call). Inspecting packets of traffic to identify a video stream at 102 may include detecting multiple reference frames in the video stream. Selectively transmitting the plurality of sub-streams, at 106, in such instances may include selectively transmitting the plurality of sub-streams using a second RAT. The second RAT may be used to enable the transmission of a higher quality stream on an RAT that may have a higher available bandwidth (e.g., Wi-Fi). The second RAT may also, or alternatively, be used for redundancy purposes, such as when the video stream is also transmitted on the first RAT for example, for possible bit errors that may be caused due to a fading channel. In some instances, selectively transmitting the sub-streams at 106 may include blocking transmission of at least one sub-stream based on one or more capabilities of user equipment.

Selectively transmitting the plurality of sub-streams at 106 may be performed according to various policies as described herein. For example, the sub-streams and/or RATs may be selected and the sub-streams may be transmitted based on one or more pre-defined policies. The pre-defined policies may include user defined policies, network operator policies, enterprise owner policies, and/or application policies for example. The pre-defined policies may be selected and/or established to meet a service requirement or a certain level of QoS. The policies may correspond to the characteristics of a sub-stream. By inspecting the traffic (e.g., performing deep packet inspection and/or the like), one or more characteristics of the video (e.g., stream or conversational) applications may be identified. In turn, decisions may be made for how to treat such video applications within BWM and/or bandwidth aggregation BWA systems and/or methods.

The embodiments described herein may identify video streams from video applications and/or services, such as 2-way video calling, video conferencing, video share unicast/multicast, video streaming, and/or video/TV broadcast over wireless and/or cellular channels. The embodiments described herein may be implemented using any wired and/or wireless BWM and/or BWA scenario permutation, including BWM/BWA permutations using RATs for WiMax and Wi-Fi, WiMax and 3G, WiMax and Wi-Fi or 3G, and/or Wi-Fi, 3G, and TVWS spectrum for example.

FIGS. 2A-2E are block diagrams illustrating an example communications system 200 in which one or more disclosed embodiments may be implemented. The communications system 200 may be a multiple access system that may provide content, such as voice, data, video, messaging, broadcast, etc., to multiple wireless users. The communications system 200 may enable multiple wireless users to access such content through the sharing of system resources, including wireless bandwidth. For example, the communications systems 200 may employ one or more channel access methods, such as code division multiple access ("CDMA"), time division multiple access ("TDMA"), frequency division multiple access ("FDMA"), orthogonal FDMA ("OFDMA"), single carrier FDMA ("SC-FDMA"), and/or the like.

Figure 2A:
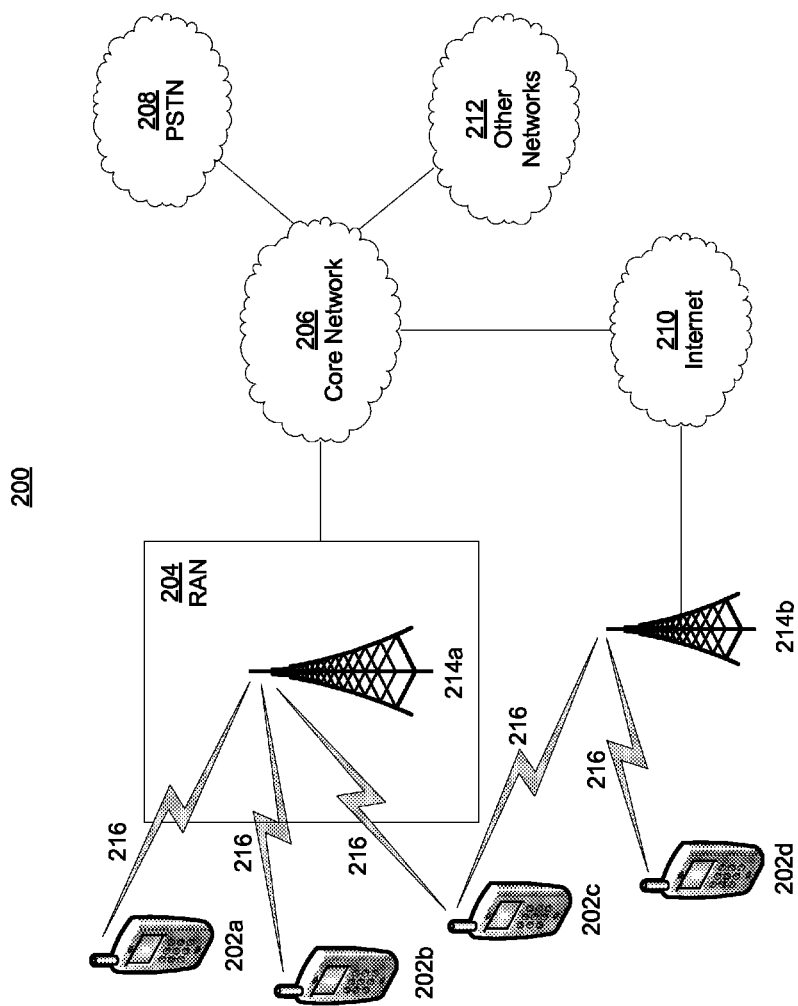
FIG. 2A is a block diagram illustrating an example of a communications system in which one or more disclosed embodiments may be implemented.

As shown in FIG. 2A, the communications system 200 may include wireless transmit/receive units ("WTRUs") 202a, 202b, 202c, 202d, a radio access network ("RAN") 204, a core network 206, a public switched telephone network ("PSTN") 208, the Internet 210, and other networks 212, though it will be appreciated that the disclosed embodiments contemplate any number of WTRUs, base stations, networks, and/or network elements. Each of the WTRUs 202a, 202b, 202c, 202d may be any type of device configured to operate and/or communicate in a wireless environment. By way of example, the WTRUs 202a, 202b, 202c, 202d may be configured to transmit and/or receive wireless signals and may include user equipment ("UE"), a mobile station, a fixed or mobile subscriber unit, a pager, a cellular telephone, a personal digital assistant ("PDA"), a Smartphone, a laptop, a netbook, a personal computer, a wireless sensor, consumer electronics, and/or the like.

The communications systems 200 may also include a base station 214a and a base station 214b. Each of the base stations 214a, 214b may be any type of device configured to wirelessly interface with at least one of the WTRUs 202a, 202b, 202c, 202d to facilitate access to one or more communication networks, such as the core network 206, the Internet 210, and/or the networks 212. By way of example, the base stations 214a, 214b may be a base transceiver station ("BTS"), a Node-B, an eNode B, a Home Node B, a Home eNode B, a site controller, an access point ("AP"), a wireless router, and the like. While the base stations 214a, 214b are each depicted as a single element, it will be appreciated that the base stations 214a, 214b may include any number of interconnected base stations and/or network elements.

The base station 214a may be part of the RAN 204, which may also include other base stations and/or network elements (not shown), such as a base station controller ("BSC"), a radio network controller ("RNC"), relay nodes, etc. The base station 214a and/or the base station 214b may be configured to transmit and/or receive wireless signals within a particular geographic region, which may be referred to as a cell (not shown). The cell may further be divided into cell sectors. For example, the cell associated with the base station 214a may be divided into three sectors. Thus, in one embodiment, the base station 214a may include three transceivers, e.g., one for each sector of the cell. In another embodiment, the base station 214a may employ multiple-input multiple output ("MIMO") technology and, therefore, may utilize multiple transceivers for each sector of the cell.

The base stations 214a, 214b may communicate with one or more of the WTRUs 202a, 202b, 202c, 202d over an air interface 216, which may be any suitable wireless communication link (e.g., radio frequency ("RF"), microwave, infrared ("IR"), ultraviolet ("UV"), visible light, etc.). The air interface 216 may be established using any suitable RAT.

More specifically, as noted above, the communications system 200 may be a multiple access system and may employ one or more channel access schemes, such as CDMA, TDMA, FDMA, OFDMA, SC-FDMA, and the like. For example, the base station 214a in the RAN 204 and the WTRUs 202a, 202b, 202c may implement a radio technology such as Universal Mobile Telecommunications System ("UMTS") Terrestrial Radio Access ("UTRA"), which may establish the air interface 216 using wideband CDMA ("WCDMA"). WCDMA may include communication protocols such as High-Speed Packet Access ("HSPA") and/or Evolved HSPA ("HSPA+"). HSPA may include High-Speed Downlink Packet Access ("HSDPA") and/or High-Speed Uplink Packet Access ("HSUPA").

In another embodiment, the base station 214a and the WTRUs 202a, 202b, 202c may implement a radio technology, such as Evolved UMTS Terrestrial Radio Access ("E-UTRA"), which may establish the air interface 216 using Long Term Evolution ("LTE") and/or LTE-Advanced ("LTE-A").

In other embodiments, the base station 214a and the WTRUs 202a, 202b, 202c may implement radio technologies such as IEEE 802.16 (i.e., Worldwide Interoperability for Microwave Access ("WiMAX")), CDMA2000, CDMA2000 1x, CDMA2000 EV-DO, Interim Standard 2000 ("IS-2000"), Interim Standard 95 ("IS-95"), Interim Standard 856 ("IS-856"), Global System for Mobile communications ("GSM"), Enhanced Data rates for GSM Evolution ("EDGE"), GSM EDGE ("GERAN"), and/or the like.

The base station 214b in FIG. 2A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 214b and the WTRUs 202c, 202d may implement a radio technology such as IEEE 802.11 to establish a wireless local area network ("WLAN"). In another embodiment, the base station 214b and the WTRUs 202c, 202d may implement a radio technology such as IEEE 802.15 to establish a wireless personal area network ("WPAN"). In yet another embodiment, the base station 214b and the WTRUs 202c, 202d may utilize a cellular-based RAT (e.g., WCDMA, CDMA2000, GSM, LTE, LTE-A, etc.) to establish small-scale cell, such as a microcell, picocell or femtocell. As shown in FIG. 2A, the base station 214b may have a direct connection to the Internet 210. Thus, the base station 214b may not be required to access the Internet 210 via the core network 206.

The RAN 204 may be in communication with the core network 206, which may be any type of network configured to provide voice, data, applications, and/or voice over internet protocol ("VoIP") services to one or more of the WTRUs 202a, 202b, 202c, 202d. For example, the core network 206 may provide call control, billing services, mobile location-based services, pre-paid calling, Internet connectivity, video distribution, etc., and/or perform high-level security functions, such as user authentication. Although not shown in FIG. 2A, it will be appreciated that the RAN 204 and/or the core network 206 may be in direct or indirect communication with other RANs that employ the same RAT as the RAN 204 or a different RAT. For example, in addition to being connected to the RAN 204, which may be utilizing an E-UTRA radio technology, the core network 206 may also be in communication with another RAN (not shown) employing a GSM radio technology.

The core network 206 may also serve as a gateway for the WTRUs 202a, 202b, 202c, 202d to access the PSTN 208, the Internet 210, and/or other networks 212. The PSTN 208 may include circuit-switched telephone networks that provide plain old telephone service ("POTS"). The Internet 210 may include a global system of interconnected computer networks and devices that use common communication protocols, such as the transmission control protocol ("TCP"), user datagram protocol ("UDP") and the internet protocol ("IP") in the TCP/IP internet protocol suite. The networks 212 may include wired or wireless communications networks owned and/or operated by other service providers. For example, the networks 212 may include another core network connected to one or more RANs, which may employ the same RAT as the RAN 204 or a different RAT.

Some or all of the WTRUs 202a, 202b, 202c, 202d in the communications system 200 may include multi-mode capabilities, e.g., the WTRUs 202a, 202b, 202c, 202d may include multiple transceivers for communicating with different wireless networks over different wireless links. For example, the WTRU 202c shown in FIG. 2A may be configured to communicate with the base station 214a, which may employ a cellular-based radio technology, and with the base station 214b, which may employ an IEEE 802 radio technology.

Figure 2B:
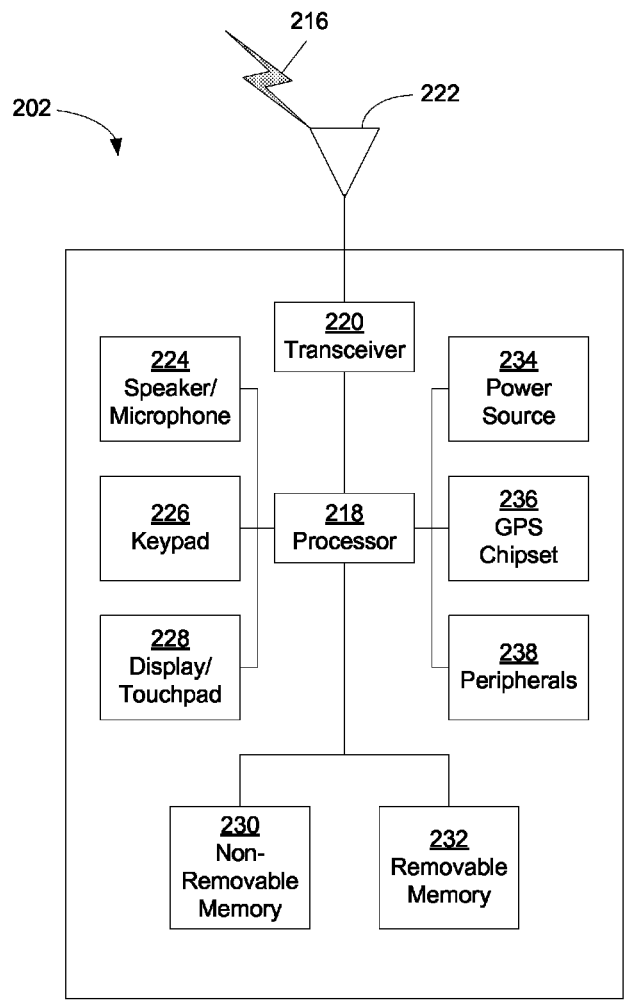
FIG. 2B is a block diagram illustrating example details of a wireless transmit/receive unit ("WTRU") of the communications system.

FIG. 2B is a system diagram of an example WTRU 202. As shown in FIG. 2B, the WTRU 202 may include a processor 218, a transceiver 220, a transmit/receive element 222, a speaker/microphone 224, a keypad 226, a display/touchpad 228, non-removable memory 230, removable memory 232, a power source 234, a global positioning system ("GPS") chipset 236, and other peripherals 238. It will be appreciated that the WTRU 202 may include any sub-combination of the foregoing elements while remaining consistent with an embodiment.

The processor 218 may be a general purpose processor, a special purpose processor, a conventional processor, a digital signal processor ("DSP"), a plurality of microprocessors, one or more microprocessors in association with a DSP core, a controller, a microcontroller, Application Specific Integrated Circuits ("ASICs"), Field Programmable Gate Array ("FPGAs") circuits, any other type of integrated circuit ("IC"), a state machine, and the like. The processor 218 may perform signal coding, data processing, power control, input/output processing, and/or any other functionality that enables the WTRU 202 to operate in a wireless environment. The processor 218 may be coupled to the transceiver 220, which may be coupled to the transmit/receive element 222. While FIG. 2B depicts the processor 218 and the transceiver 220 as separate components, it will be appreciated that the processor 218 and the transceiver 220 may be integrated together in an electronic package or chip.

The transmit/receive element 222 may be configured to transmit signals to, or receive signals from, a base station (e.g., the base station 214a) over the air interface 216. For example, in one embodiment, the transmit/receive element 222 may be an antenna configured to transmit and/or receive RF signals. In another embodiment, the transmit/receive element 222 may be an emitter/detector configured to transmit and/or receive IR, UV, or visible light signals, for example. In yet another embodiment, the transmit/receive element 222 may be configured to transmit and receive both RF and light signals. It will be appreciated that the transmit/receive element 222 may be configured to transmit and/or receive any combination of wireless signals.

In addition, although the transmit/receive element 222 is depicted in FIG. 2B as a single element, the WTRU 202 may include any number of transmit/receive elements 222. More specifically, the WTRU 202 may employ MIMO technology. Thus, in one embodiment, the WTRU 202 may include two or more transmit/receive elements 222 (e.g., multiple antennas) for transmitting and receiving wireless signals over the air interface 216.

The transceiver 220 may be configured to modulate the signals that are to be transmitted by the transmit/receive element 222 and to demodulate the signals that are received by the transmit/receive element 222. As noted above, the WTRU 202 may have multi-mode capabilities. Thus, the transceiver 220 may include multiple transceivers for enabling the WTRU 202 to communicate via multiple RATs, such as UTRA and IEEE 802.11, for example.

The processor 218 of the WTRU 202 may be coupled to, and may receive user input data from, the speaker/microphone 224, the keypad 226, and/or the display/touchpad 228 (e.g., a liquid crystal display ("LCD") display unit or organic light-emitting diode ("OLED") display unit). The processor 218 may also output user data to the speaker/microphone 224, the keypad 226, and/or the display/touchpad 228. In addition, the processor 218 may access information from, and store data in, any type of suitable memory, such as the non-removable memory 230 and/or the removable memory 232. The non-removable memory 230 may include random-access memory ("RAM"), read-only memory ("ROM"), a hard disk, or any other type of memory storage device. The removable memory 232 may include a subscriber identity module ("SIM") card, a memory stick, a secure digital ("SD") memory card, and/or the like. In other embodiments, the processor 218 may access information from, and store data in, memory that is not physically located on the WTRU 202, such as on a server or a home computer (not shown).

The processor 218 may receive power from the power source 234, and may be configured to distribute and/or control the power to the other components in the WTRU 202. The power source 234 may be any suitable device for powering the WTRU 202. For example, the power source 234 may include one or more dry cell batteries (e.g., nickel-cadmium ("NiCd"), nickel-zinc ("NiZn"), nickel metal hydride ("NiMH"), lithium-ion ("Li-ion"), etc.), solar cells, fuel cells, and/or the like.

The processor 218 may also be coupled to the GPS chipset 236, which may be configured to provide location information (e.g., longitude and latitude) regarding the current location of the WTRU 202. In addition to, or in lieu of, the information from the GPS chipset 236, the WTRU 202 may receive location information over the air interface 216 from a base station (e.g., base stations 214a, 214b) and/or determine its location based on the timing of the signals being received from two or more nearby base stations. It will be appreciated that the WTRU 202 may acquire location information by way of any suitable location-determination method while remaining consistent with an embodiment.

The processor 218 may further be coupled to other peripherals 238, which may include one or more software and/or hardware modules that provide additional features, functionality and/or wired or wireless connectivity. For example, the peripherals 238 may include an accelerometer, an e-compass, a satellite transceiver, a digital camera (for photographs or video), a universal serial bus ("USB") port, a vibration device, a television transceiver, a hands free headset, a Bluetooth® module, a frequency modulated ("FM") radio unit, a digital music player, a media player, a video game player module, an Internet browser, and/or the like.

Figure 2C:
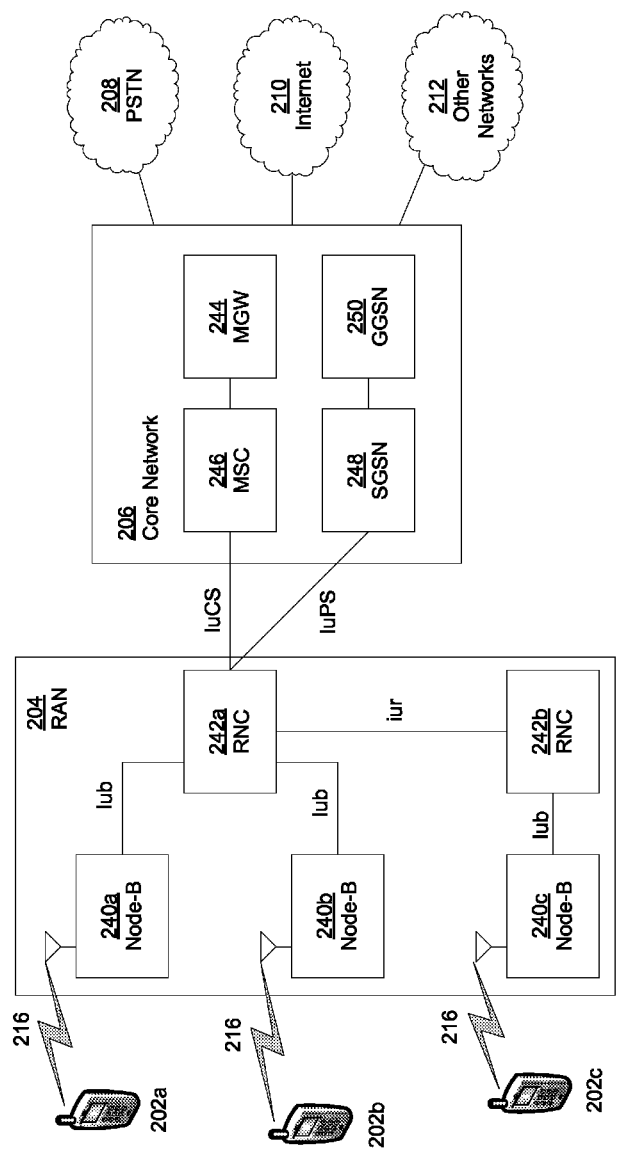
FIG. 2C is a block diagram illustrating example details of radio-access and core networks of the communications system.

FIG. 2C is a system diagram of the RAN 204 and the core network 206 according to an embodiment. As noted above, the RAN 204 may employ an E-UTRA radio technology to communicate with the WTRUs 202a, 202b, and 202c over the air interface 216. The RAN 204 may also be in communication with the core network 206. As shown in FIG. 2C, the RAN 204 may include Node-Bs 240a, 240b, 240c, which may each include one or more transceivers for communicating with the WTRUs 202a, 202b, 202c over the air interface 216. The Node-Bs 240a, 240b, 240c may each be associated with a particular cell (not shown) within the RAN 204. The RAN 204 may also include RNCs 242a, 242b. It will be appreciated that the RAN 204 may include any number of Node-Bs and RNCs while remaining consistent with an embodiment.

As shown in FIG. 2C, the Node-Bs 240a, 240b may be in communication with the RNC 242a. Additionally, the Node-B 240c may be in communication with the RNC 142b. The Node-Bs 240a, 240b, 240c may communicate with the respective RNCs 242a, 242b via an Iub interface. The RNCs 242a, 242b may be in communication with one another via an Iur interface. Each of the RNCs 242a, 242b may be configured to control the respective Node-Bs 240a, 240b, 240c to which it is connected. In addition, each of the RNCs 242a, 242b may be configured to carry out or support other functionality, such as outer loop power control, load control, admission control, packet scheduling, handover control, macro diversity, security functions, data encryption, and/or the like.

The core network 206 shown in FIG. 2C may include a media gateway ("MGW") 244, a mobile switching center ("MSC") 246, a serving GPRS support node ("SGSN") 248, and/or a gateway GPRS support node ("GGSN") 250. While each of the foregoing elements are depicted as part of the core network 206, it will be appreciated that any one of these elements may be owned and/or operated by an entity other than the core network operator.

The RNC 242a in the RAN 204 may be connected to the MSC 246 in the core network 206 via an IuCS interface. The MSC 246 may be connected to the MGW 244. The MSC 246 and the MGW 244 may provide the WTRUs 202a, 202b, 202c with access to circuit switched networks, such as the PSTN 208, to facilitate communications between the WTRUs 202a, 202b, 202c and traditional land-line communications devices.

The RNC 242a in the RAN 204 may also be connected to the SGSN 248 in the core network 206 via an IuPS interface. The SGSN 248 may be connected to the GGSN 250. The SGSN 248 and the GGSN 250 may provide the WTRUs 202a, 202b, 202c with access to packet-switched networks, such as the Internet 210, to facilitate communications between and the WTRUs 202a, 202b, 202c and IP-enabled devices.

As noted above, the core network 206 may also be connected to the networks 212, which may include other wired or wireless networks that are owned and/or operated by other service providers.

Figure 2D:
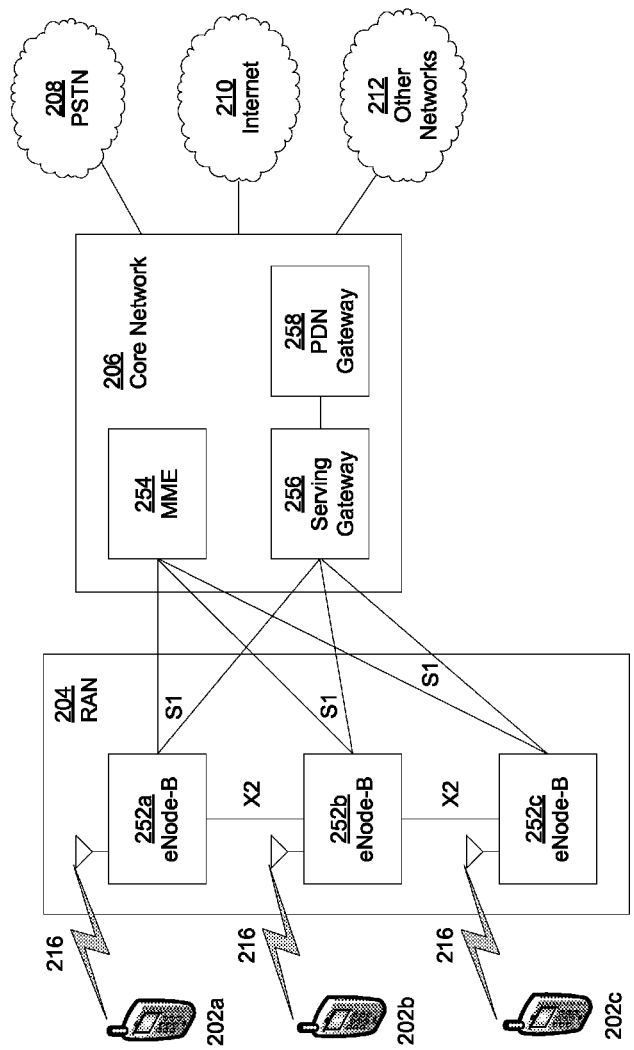
FIG. 2D is a block diagram illustrating example details of alternative radio-access and core networks of the communications system.

FIG. 2D is a system diagram of the RAN 204 and the core network 206 according to an embodiment. As noted above, the RAN 204 may employ an E-UTRA radio technology to communicate with the WTRUs 202a, 202b, 202c over the air interface 216. The RAN 204 may also be in communication with the core network 206.

The RAN 204 may include eNode-Bs 252a, 252b, 252c, though it will be appreciated that the RAN 204 may include any number of eNode-Bs while remaining consistent with an embodiment. The eNode-Bs 252a, 252b, 252c may each include one or more transceivers for communicating with the WTRUs 202a, 202b, 202c over the air interface 216. In one embodiment, the eNode-Bs 252a, 252b, 252c may implement MIMO technology. Thus, the eNode-B 252a, for example, may use multiple antennas to transmit wireless signals to, and receive wireless signals from, the WTRU 202a.

Each of the eNode-Bs 252a, 252b, and 252c may be associated with a particular cell (not shown) and may be configured to handle radio resource management decisions, handover decisions, scheduling of users in the uplink and/or downlink, and/or the like. As shown in FIG. 2D, the eNode-Bs 252a, 252b, 252c may communicate with one another over an X2 interface.

The core network 206 shown in FIG. 2D may include a mobility management gateway ("MME") 254, a serving gateway 256, and a packet data network ("PDN") gateway 258. While each of the foregoing elements are depicted as part of the core network 206, it will be appreciated that any one of these elements may be owned and/or operated by an entity other than the core network operator.

The MME 254 may be connected to each of the eNode-Bs 252a, 252b, and 252c in the RAN 204 via an Si interface and may serve as a control node. For example, the MME 254 may be responsible for authenticating users of the WTRUs 202a, 202b, 202c, bearer activation/deactivation, selecting a particular serving gateway during an initial attach of the WTRUs 202a, 202b, 202c, and/or the like. The MME 254 may also provide a control plane function for switching between the RAN 204 and other RANs (not shown) that employ other radio technologies, such as GSM or WCDMA.

The serving gateway 256 may be connected to each of the eNode Bs 252a, 252b, 252c in the RAN 204 via the Si interface. The serving gateway 256 may generally route and forward user data packets to/from the WTRUs 202a, 202b, 202c. The serving gateway 256 may also perform other functions, such as anchoring user planes during inter-eNode B handovers, triggering paging when downlink data is available for the WTRUs 202a, 202b, 202c, managing and storing contexts of the WTRUs 202a, 202b, 202c, and/or the like.

The serving gateway 256 may also be connected to the PDN gateway 258, which may provide the WTRUs 202a, 202b, 202c with access to packet-switched networks, such as the Internet 210, to facilitate communications between the WTRUs 202a, 202b, 202c and IP-enabled devices.

The core network 206 may facilitate communications with other networks. For example, the core network 206 may provide the WTRUs 202a, 202b, 202c with access to circuit-switched networks, such as the PSTN 208, to facilitate communications between the WTRUs 202a, 202b, 202c and traditional land-line communications devices. For example, the core network 206 may include, or may communicate with, an IP gateway (e.g., an IP multimedia subsystem ("IMS") server) that serves as an interface between the core network 206 and the PSTN 208. In addition, the core network 206 may provide the WTRUs 202a, 202b, 202c with access to the networks 212, which may include other wired or wireless networks that are owned and/or operated by other service providers.

Figure 2E:
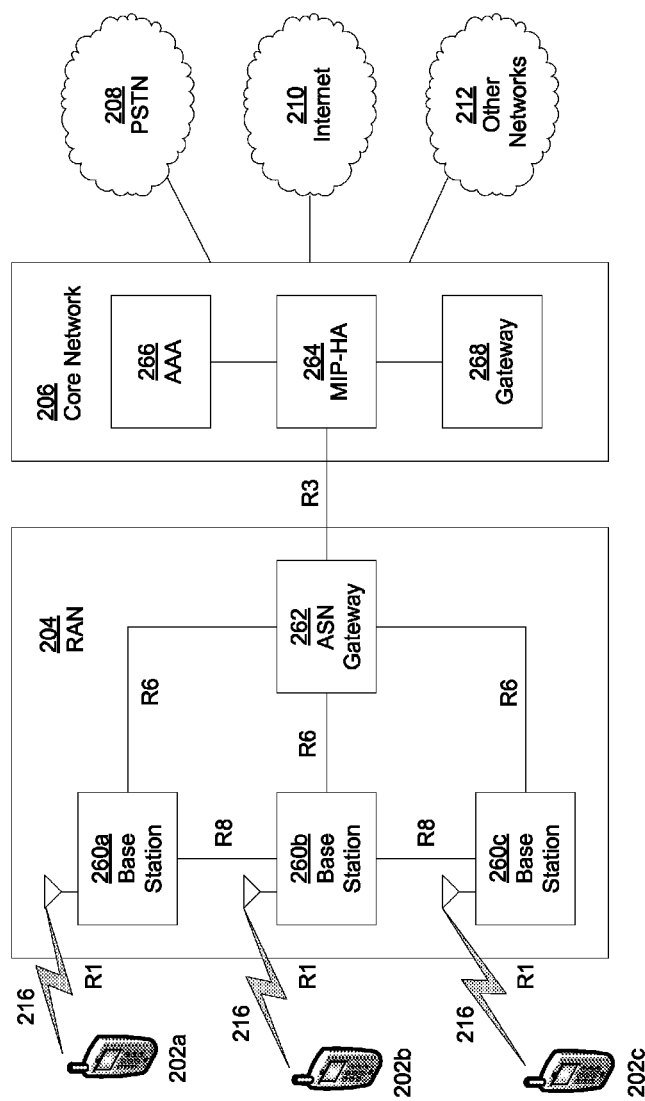
FIG. 2E is a block diagram illustrating example details of other alternative radio-access and core networks of the communications system.

FIG. 2E is a system diagram of the RAN 204 and the core network 206 according to an embodiment. The RAN 204 may be an access service network ("ASN") that employs, for example, IEEE 802.16 radio technology to communicate with the WTRUs 202a, 202b, 202c over the air interface 216. As will be further discussed below, the communication links between the different functional entities of the WTRUs 202a, 202b, 202c, the RAN 204, and the core network 206 may be defined as reference points.

As shown in FIG. 2E, the RAN 204 may include base stations 260a, 260b, 260c, and an ASN gateway 262, though it will be appreciated that the RAN 204 may include any number of base stations and ASN gateways while remaining consistent with an embodiment. The base stations 260a, 260b, 260c may each be associated with a particular cell (not shown) in the RAN 204 and may each include one or more transceivers for communicating with the WTRUs 202a, 202b, 202c over the air interface 216. In one embodiment, the base stations 260a, 260b, 260c may implement MIMO technology. Thus, the base station 260a, for example, may use multiple antennas to transmit wireless signals to, and receive wireless signals from, the WTRU 202a. The base stations 260a, 260b, 260c may also provide mobility management functions, such as handoff triggering, tunnel establishment, radio resource management, traffic classification, QoS policy enforcement, and/or the like. The ASN gateway 262 may serve as a traffic aggregation point, and may be responsible for paging, caching of subscriber profiles, routing to the core network 206, and/or the like.

The air interface 216 between the WTRUs 202a, 202b, 202c and the RAN 204 may be defined as an R1 reference point that implements the IEEE 802.16 specification, for example. In addition, each of the WTRUs 202a, 202b, 202c may establish a logical interface (not shown) with the core network 206. The logical interface between the WTRUs 202a, 202b, 202c and the core network 206 may be defined as an R2 reference point, which may be used for authentication, authorization, IP host configuration management, and/or mobility management.

The communication link between each of the base stations 260a, 260b, 260c may be defined as an R8 reference point that includes protocols for facilitating WTRU handovers and the transfer of data between base stations. The communication link between the base stations 260a, 260b, 260c and the ASN gateway 262 may be defined as an R6 reference point. The R6 reference point may include protocols for facilitating mobility management based on mobility events associated with each of the WTRUs 202a, 202b, 202c.

As shown in FIG. 2E, the RAN 204 may be connected to the core network 206. The communication link between the RAN 204 and the core network 206 may defined as an R3 reference point that includes protocols for facilitating data transfer and mobility management capabilities, for example. The core network 206 may include a mobile IP home agent ("MIP-HA") 264, an authentication, authorization, accounting ("AAA") server 266, and a gateway 268. While each of the foregoing elements are depicted as part of the core network 206, it will be appreciated that any one of these elements may be owned and/or operated by an entity other than the core network operator.

The MIP-HA 264 may be responsible for IP address management, and may enable the WTRUs 202a, 202b, 202c to roam between different ASNs and/or different core networks. The MIP-HA 264 may provide the WTRUs 202a, 202b, 202c with access to packet-switched networks, such as the Internet 210, to facilitate communications between the WTRUs 202a, 202b, 202c and IP-enabled devices. The AAA server 266 may be responsible for user authentication and for supporting user services. The gateway 268 may facilitate interworking with other networks. For example, the gateway 268 may provide the WTRUs 202a, 202b, 202c with access to circuit-switched networks, such as the PSTN 208, to facilitate communications between the WTRUs 202a, 202b, 202c and traditional land-line communications devices. In addition, the gateway 268 may provide the WTRUs 202a, 202b, 202c with access to the networks 212, which may include other wired or wireless networks that are owned and/or operated by other service providers.

Although not shown in FIG. 2E, it will be appreciated that the RAN 204 may be connected to other ASNs and the core network 206 may be connected to other core networks. The communication link between the RAN 204 the other ASNs may be defined as an R4 reference point, which may include protocols for coordinating the mobility of the WTRUs 202a, 202b, 202c between the RAN 204 and the other ASNs. The communication link between the core network 206 and the other core networks may be defined as an R5 reference, which may include protocols for facilitating interworking between home core networks and visited core networks.

One or more of the aforementioned communications systems may be used to implement the embodiments described herein. For example, the communications systems may be implemented in BWM architectures for video BWM and/or BWA.

Figure 3:
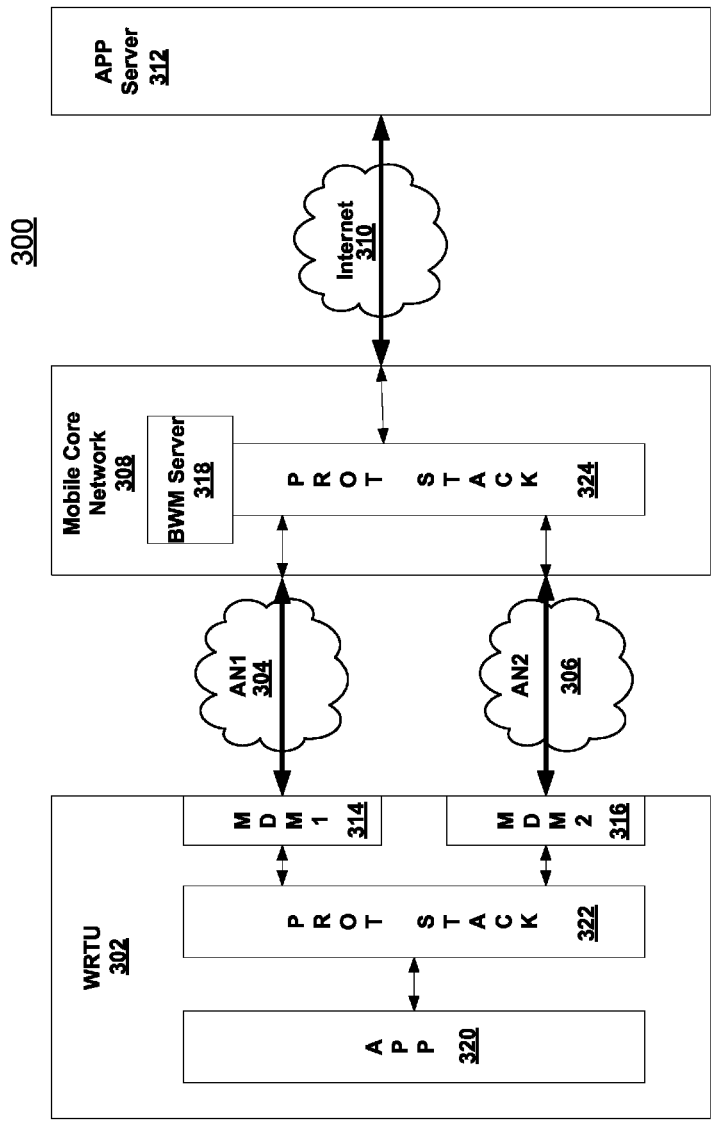
FIG. 3 is a block diagram illustrating an architecture of a system for mobile-network-based support of internet services over multiple RATs with bandwidth management ("BWM") services.

FIG. 3 is a block diagram illustrating an architecture of a system 300 for mobile-network-based support of internet services (e.g., including those with video) over multiple RATs with BWM services provided by the mobile network. The system 300 of FIG. 3 may be similar to the system 200 of FIG. 2, and for simplicity of exposition, many of the sub-elements of the system 200 are not shown in the system 300 of FIG. 3. As shown, the system 300 may include a WTRU 302, an access network AN1 304, an access network AN2 306, a mobile core network ("MCN") 308, internet 310, and/or an application server 312.

The WRTU 302 may be, for example, any of the WTRUs 202 illustrated in FIG. 2. Like the WTRUs 202, the WTRU 302 may include one or more means of communication (e.g., multiple modems). Each of the means of communicating may be adapted for communication over wired and/or wireless media. As shown, the WTRU 302 may include modems MDM1 314 and/or MDM2 316. MDM1 314 and/or MDM2 316 may be adapted for communication over wireless media. According to an example embodiment, MDM1 314 and/or MDM2 316 may comprise a modem configured to communicate via an IP interface (e.g., Wi-Fi modem or a cellular modem), or another modem configured to communicate via another interface, such as a tunnel interface or a virtual interface for example. Each of MDM1 314 and/or MDM2 316 may be adapted for communications over a licensed and/or unlicensed spectrum. For example, the MDM1 314 may be adapted for communications over a licensed (e.g., cellular) spectrum, and the MDM2 316 may be adapted for communications over unlicensed (e.g., wireless LAN or Wi-Fi) spectrum.

The WTRU 302 may include an application client 320 and/or a protocol stack 322 ("WTRU-protocol stack"). The WTRU-protocol stack 322 may be an IP protocol stack (e.g., Layer 3 ("L3")/Layer 4 ("L4") in the OSI, TCP/IP protocol stack model and a socket interface). The WTRU-protocol stack 322 may implement the network (e.g., IP) protocol, the transport (e.g., TCP and UDP) protocols, and/or a number of other protocols to assist in TCP/IP operation (e.g., ICMP). The WTRU-protocol stack 322 may be part of an operating system ("OS") of the WTRU 302. The OS may provide a socket interface to enable the application client 320 to access the WTRU-protocol stack 322, and/or request communication services from it. As described in more detail elsewhere herein, the WTRU-protocol stack 322 may include a BWM client component (not shown) for communicating with the BWM server 318 for performing BWM of video substreams. The application client 320 may be a client for some application/services that may use video. The application client 320 may be, for example, a web browser (e.g., for videos) or a client for other services (e.g., video services).

The access networks (e.g., AN1 304 and/or AN2 306), may facilitate communication between the WTRU 302 and the MCN 308. For wireless communications, each of the AN1 304 and AN2 306 may include wireless access means and access points ("APs"), such as, for example, cellular base stations in AN1 304 and/or Wi-Fi APs in AN2 306. Different ANs (e.g., AN1 304 and AN2 306) may provide different QoS for delivery of data, and the tasks of BWM may include properly mapping video services to a different AN (e.g., or RATs) in response to the different QoS.

The MCN 308 may be a core network (e.g., similar to core network 206 in FIG. 2) that may be maintained by cellular mobile operators to provide connectivity and/or mobility services to client devices (e.g., the WTRU 302). The MCN 308 may support multiple ANs, such as AN1 304 and AN2 306 for example. The MCN 308 may also include a BWM server 318. The BWM server 318 may provide an ability to map a single application flow, or portions thereof, to one or more ANs (e.g., AN1 304 and AN2 306) at the same time. The BWM server 318 may include a traffic detection function ("TDF") to carry out detection of video streams/substreams and characteristics thereof, from traffic passing through L3/L4 of the MCN 308 for example. The BWM server 318, and/or the TDF, may be incorporated into a GGSN (e.g., GGSN 250 illustrated in FIG. 2C), a PDN gateway (e.g., PDN gateway 258 illustrated in FIG. 2D), and/or an ASN gateway (e.g., ASN gateway 262 illustrated in FIG. 2E). Alternatively, the BWM server 318 and/or the TDF may be a separate entity communicatively coupled as an input to or an output from the GGSN, PDN gateway, and/or the ASN gateway. The BWM server 318 may include a protocol stack 324 ("BWM-protocol stack") that that may be a complement to the WTRU-protocol stack 322 for communicating with the BWM client. The BWM server 318 and/or the TDF may be disposed in or communicatively coupled to other elements of the MCN 308.

The internet 310 may be a connection between the MCN 308 and the application server 312. Any other IP-network or other communication network may be used in addition to, or alternative to, the internet 310. The application server 312 may be adapted to provide, or accept uploads from, content and/or services, including video streams for example. Examples of the application server 312 may include any server configured to provide applications and/or services to WTRU 302, such as a YouTube® server, a Netflix® server, interactive game servers, and/or the like. Such services may be agnostic to the network below the network protocol (e.g., IP protocol) layer that may provide delivery of the content and/or service (e.g., since data may be sent over many networks of different types). This may mean that such services may have a limited ability to optimize delivery of their content over a specific network.

Figure 4A:
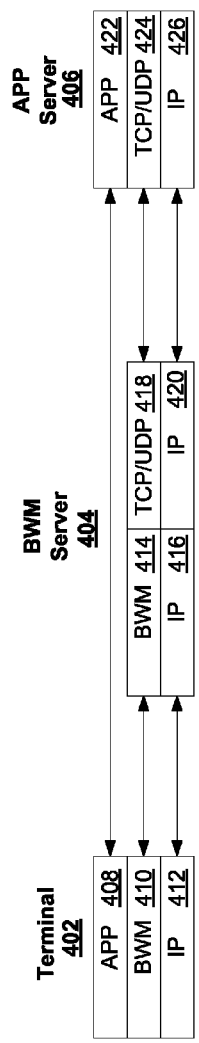
FIG. 4A is a block diagram illustrating a protocol stack example with a Layer-4 proxy at the BWM server.
Figure 4B:
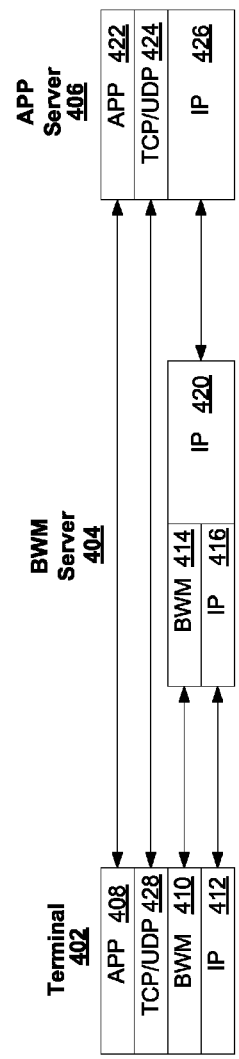
FIG. 4B is a block diagram illustrating a protocol stack example with Layer-4 tunneling.

Communication links may be established in WTRU-protocol stack 322 and BWM-protocol stack 324. Two embodiments shown at a high-level are set forth in FIGS. 4A and 4B. Variation within these embodiments and other alternatives may be possible. However, FIGS. 4A and 4B illustrate various aspects of embodiments of a protocol stack as described herein. Protocol stack layers below L3 (IP) of the WTRU-protocol stack 322 and BWM-protocol stack 324 are not shown for simplicity.

FIG. 4A is a block diagram illustrating a protocol stack example with an L4 proxy at the BWM server 404. As shown in FIG. 4A, a terminal 402, a BWM server 404, and an application server 406 may perform communications amongst one another. The terminal 402 may include an application client 408, a BWM protocol module 410, and/or an IP protocol module 412. The BWM server 404 may include a BWM protocol module 414, an IP protocol module 416, a TCP/UDP protocol module 418, and/or an IP protocol module 420. The application server 406 may include a server application 422, a TCP/UDP 424 module 424, and/or an IP protocol module 426.

The application client 408 at the terminal 402 may be in communication with the server application 422 at the application server 406. The BWM protocol module 410 at the terminal 402 may be in communication with the BWM protocol module 414 at the BWM server 404. The IP protocol module 412 at the terminal 402 may be in communication with the IP protocol module 416 at the BWM server 404. The TCP/UDP protocol module 424 at the application server 406 may be in communication with the TCP/UDP protocol module 418 at the BWM server 404. The IP protocol module 426 at the application server 406 may be in communication with the IP protocol module 420 at the BWM server 404.

As shown in FIG. 4A, the BWM server 404 may operate as an L4 protocol proxy server. Although the application connection may be end-to-end, an L4 (e.g., TCP, UDP, etc.) connection may be established between the application server 406 and the BWM server 404, with the BWM server 404 acting as an L4 proxy for the application client 408 (e.g., the BWM server 404 may operate as the application client 408 for L4 purposes). The BWM server 404 may open a connection with the application client 408 using BWM protocol module 414 which may communicate via a proprietary or like-type BWM protocol, which may be an L4 protocol for example. A "local" TCP proxy (not shown) may be used at the terminal 402 if the client application 408 is unaware of the BWM protocol. Other local TCP proxies may be used as well. The BWM server 404 may operate as an L4 protocol server for various types of video sub-streams, including I-frame, P-frame, B-frame, and/or other sub-streams for example that may be partitioned from a video stream.

Referring now to FIG. 4B, a block diagram illustrating a protocol stack example with L4 tunneling is shown. As shown in FIG. 4B, the terminal 402 may include a TCP/UDP protocol module 428. The TCP/UDP module 428 at the terminal 402 may communicate with the TCP/UDP protocol module at the application server 406. In this example embodiment, the BWM server 404 may be transparent to the TCP/UDP protocol.

As shown in FIG. 4B, the client application 408 and the application server 406 may maintain an end-to-end standard L4 (e.g., TCP or UDP) connection. The L4 protocol may be tunneled through an L4 BWM protocol or an L3 BWM protocol overlaid on top of a standard IP protocol, which may support an end-to-end standard L4 connection. This tunneling of the L4 protocol may be implemented for video sub-streams, such as I-frame sub-streams, P-frame sub-streams, B-frame sub-streams, and/or other sub-streams for example.

Other protocol stack configurations and/or associated connections may be implemented. For example, the client application 408 and server application 422 may establish end-to-end IP connection tunneled through the BWM server 404. However the connections may be implemented, one or more of conditions and/or operations that are described herein may be met. For example, the BWM server 404 may be transparent to the application flow, which may be end-to-end. Being transparent to the application flow, however, may not prevent the BWM server 404 from looking at and/or manipulating traffic of the application flow. In another example, the BWM server 404 may actively manage links and/or L3/L4 levels (e.g., the IP network protocol and/or transport protocols). With this ability, the BWM server 404 may provide effective management of application-specific traffic.

To facilitate BWM, the BWM server 404 may include a traffic inspection mechanism, a BWM protocol server, a proxy for L4 connections ("L4 connection proxy") (e.g., optionally), a memory, and/or one or more processors. The traffic inspection mechanism may be adapted to isolate traffic coming from different applications. The traffic inspection mechanism may be, for example, a Deep Packet Inspection ("DPI") mechanism. DPI may include a class of algorithm used for detection and identification of various types of IP traffic. Other traffic inspection mechanisms may alternatively, or additionally, be used. The BWM protocol server may include a scheduler. This scheduler may be capable of scheduling traffic to available connections, using application specific rules for example. That is, for example, the scheduler may be capable of applying different rules or policies to IP traffic belonging to different applications and/or having different characteristics. For example, the scheduler may allocate the available bandwidth, or a pre-defined portion thereof, on a preferred RAT to a preferred application. The L4 connection proxy, which may be a tunnel encoder/decoder, etc., may be adapted to support operations used for L4 connections for various BWM options. Similarly, the terminal 402 may include traffic inspection capabilities and/or BWM protocol capabilities.

Similar capabilities may be present at the WTRU, for example, to enable the WTRU to detect video traffic and/or video sub-flows and implement BWM policies (e.g., in conjunction with the BWM server 318). One means of implementing such functionality in the WTRU may be by using a DPI algorithm. However, DPI mechanisms may be too complex for many WTRUs. An alternative approach may be to provide applications means of specifying the type of content that is being transmitted. Thus, for example, applications which generate video streams may be provided with a means to indicate to a BWM client on the WTRU that a video stream is being transmitted. Moreover, the application may be further enabled to provide the details of the video stream, for example the details about its sub-streams. One way to do so may be to enhance the commonly used interface between applications and the IP stack, called the socket interface. The socket interface may be enhanced to provide an application means to describe the type of data being communicated and in particular the details of the video stream. The information passed over such an advanced socket interface ("ASIF") may be used by the IP stack and/or BWM client to properly map the video sub-streams to the appropriate interfaces and RATs.

According to another example embodiment, the ASIF may be a proprietary extension to the socket interface. To provide a more standard approach, the ASIF may include a sniffer function that may be designed to infer the traffic (e.g., video traffic) parameters from traffic (e.g., via DPI), and/or via application identity, transport port, or the like. The sniffer function in the ASIF may be configurable via policies as to the complexity level that may be used for traffic identification. For example, the techniques described herein, or a subset thereof, may be available and one or more of the techniques may be used the sniffer function. These one or more techniques may be selected based on policies.

An example technique for traffic identification may include IP Packet header inspection. This technique may identify traffic based on the information included in the header of the IP packet. Since inspection of the IP header may be used for BWM operations, the incremental complexity of this technique may be low.

Another example technique for traffic identification may include L4 (e.g., TCP/UDP) traffic monitoring. This technique may be capable of looking at the L4 traffic to obtain key statistics (e.g., throughput, congestion, etc.) regarding the traffic. The complexity of L4 traffic monitoring may depend on the specific measurement to be performed. However, it may be low (e.g., measurements that may use a lot of processing may not be used as often).

Another example technique for traffic identification may include application monitoring. This is a technique that may use an OS-provided capability to match active applications with active sockets in the socket interface. Application monitoring may be a relatively low complexity technique and may be implemented in user space of the OS on the device (e.g., if there is interface capability by the OS).

Another example technique for traffic identification may include a 3GPP-specific application interface. This may be a 3GPP-specific application interface, such as a 3GPP-defined ASIF for example, that may allow applications to specify characteristics, such as the type of traffic to be used (e.g., QoS Class), multimedia codec used, and/or other characteristics for example.

Another example technique for traffic identification may include DPI. As described herein, this may be a set of techniques that may look inside IP traffic to provide precise identification of the traffic in the packet. The DPI techniques may be of a relatively higher complexity, so running DPI on the WTRU may be performed judiciously.

Superficial packet inspection techniques may provide less information, and thus may be less accurate, than deep packet inspection techniques. The superficial packet inspection techniques may, however, comprise a lower complexity. Each of the superficial packet inspection and deep packet inspection techniques may encompass different and/or incompatible techniques.

The WTRU video traffic and/or sub-flow detection techniques described herein may be capable of isolating traffic based on application (e.g., which OS process opened the traffic) and/or traffic type (e.g., video, audio, etc.). The embodiments described herein may be used to inspect video traffic and separate and/or partition (collectively "partitioning") such video traffic into sub-streams of video traffic in a way that may allow optimization of video delivery and/or prioritization of components of the video traffic.

Video-transmission implementations may take advantage of the structure of video encoding to optimize transmission. These implementations may be integrated with the video encoding process (e.g., the application). Optimization may be performed at the application, but in some example embodiments the application may not be aware of the properties and/or state of transport (e.g., in internet-based services where a single server may be serving different clients, which may be spread over different networks with different network conditions).

Described herein are embodiments that may be used to make one or more BWM entities aware of the internal details of video streams. For example, BWM may include traffic inspection capabilities (e.g., at the BWM server 318 and/or at the WTRU/terminal 302). These traffic inspection capabilities may go beyond identifying traffic as video. For example, the BWM server 318 or other BWM entity may partition video into sub-streams according to various characteristics associated with the sub-streams. This partitioning may take advantage of the structured approach to video coding for example. Such sub-streams may be managed separately. For example, higher priority video sub-streams may get higher priority of transmission. This priority may be implemented according to various policies. The priority selection and/or assignment associated with these sub-streams may be sensitive to the loads introduced into the mobile network and/or access network. For example, high-bit-rate traffic may be less critical and may be off-loaded from one RAT to another (e.g., from Wi-Fi from cellular air interfaces). According to another example embodiment, transmission of high-resolution video components may be blocked, for example, if they are being sent to a WTRU that may not take advantage of high-resolution video. Deep Video Inspection and/or BWM systems and methods may take advantage of such sub-stream inspection to manage mobile network bandwidth and/or other network resources.

The video traffic in wireless and/or cellular systems may include unicast video traffic, such as viewing via a player or user-generated-content ("UGC") host (e.g., YouTube® or other professional content hosts) for example. Videos that may be hosted on these sites may be in compressed format, via standard CODECs (e.g., H.263, H.264, or On2/VP8/WebM) or proprietary CODECs (e.g., DivX/Sorenson/RV-Real Video) for example. Another embodiment where high traffic video may be used is video calling, such as 2-way video calling and/or video conferencing for example. Handsets or other WTRUs having a camera (e.g., back and/or forward user facing camera) may be implemented in video calling. Other desktop video calling software ("SW") may provide services to mobile devices. Video services may be provided as described herein to work as seamless as they work on other (e.g., non-mobile) devices and/or networks. To enable such an experience, multiple RAT BWM and/or BWA systems and methods are described herein.

Example embodiments are described herein for BWM and/or BWA for streaming video. For example, BWM and/or BWA may be performed by video coding of video frames. Unicast video may be in a compressed format. It may be served from a server farm (e.g., flash servers) or cloud service providers (e.g., Amazon® EC2, YouTube®, etc.). Compressed video may have particular picture or frame types (collectively "frame types"). Frame types that may be used in various video algorithms may include I-frames, P-frames, and/or B-frames. The I-frames, P-frames, and B-frames may each comprise different characteristics. For example, the I-frames may be less compressible than the P-frames and/or B-frames, and may be decoded without the use of other video frames. The P-frames may use data from previous frames to decompress, and may be more compressible than the I-frames for example. The B-frames may use previous and/or forward frames for data reference to get the highest amount of data compression. Various types of CODECs (e.g., H.263 and H.264 standard CODECs) may use these frame types.

Figure 5:
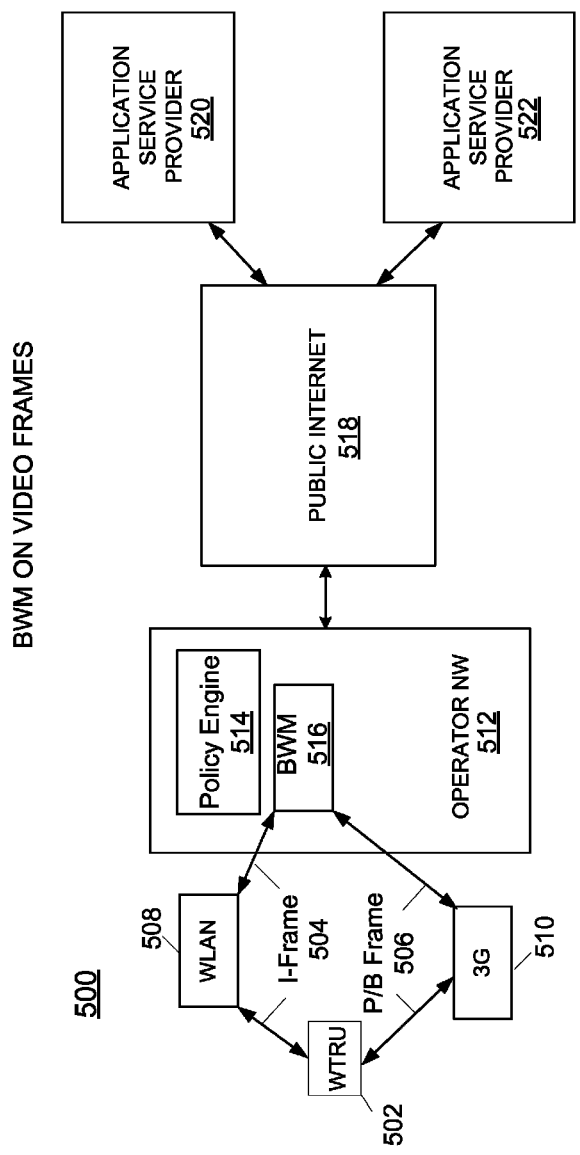
FIG. 5 is a block diagram illustrating an example BWM system.

FIG. 5 is a diagram showing an example embodiment of a communications system 500 for performing BWM using a BWM entity 516. The BWM entity 516 may be a BWM server, such as BWM server 318 or 404 for example, but may be any other BWM entity. As illustrated in FIG. 5, the BWM entity 516 may be included in an operator network 512. While the BWM entity 516 is illustrated as being included in the operator network 512, the BWM entity 516 is not required to be included in the operator network 512, but may be an external entity. The BWM entity 516 may be in communication with a policy engine 514 for implementing various policies when processing video packet data (e.g., identifying sub-streams, partitioning sub-streams, and/or selecting RATs for transmission). The policy engine 514 may be associated with the operator network 512 and/or may store various types of policies (e.g., user policies, operator network policies, application provider policies enterprise IT policies, etc.). The policies in the policy engine 514 may be selected and/or established based on a service requirement, a certain level of QoS, a price or price range, a quality, a time of day, a type of video stream, a type of video content, and/or traffic congestion circumstances in the network (e.g., operator network) for example.

The BWM entity 516 may be configured to receive streaming video packet data from one or more application service providers, such as application service provider 520 and/or application service provider 522 for example. The streaming video packet data may be received via an IP network, such as the public internet 518, or any other communications network for example. The BWM entity 516 may also receive the streaming video packet data via the operator network 512. The BWM entity 516 may be configured to send streaming video packet data to a user device, such as WTRU 502 for example. The streaming video packet data may be sent over one or more RATs, such as via WLAN 508 and/or 3G network entity 510 for example.

The BWM entity 516 may be configured to inspect a streaming video packet sequence (e.g., a video stream) and identify one or more sub-streams. The sub-streams may be identified based on one or more characteristics associated with a sub-stream. For example, the BWM entity 516 may identify the frame and/or group-of-pictures ("GOP") structure from the video stream. Identification of these parameters may be done by analyzing the bits of the video stream ("video-bit stream") (e.g., in real-time). Once identified, the BWM entity 516 may route the video frames using one or more RATs. For example, the BWM entity 516 may identify and route the I-frame(s) 504 using a more reliable radio link layer, such as a Wi-Fi communication via the WLAN 508 or another link associated with a sufficiently high QoS for example. The BWM entity 516 may route the P/B frame(s) 506 using a more bandwidth challenged radio link, such as a 3G communication via 3G network entity 510 or another link associated with a lower QoS for example.

Once the packets are analyzed, and/or the video stream payload is analyzed, the bits of the encoded video may be separated and used to formulate an IP packet payload. Each sub-stream may be formulated into separate IP flows. Each flow may be associated with a set of parameters, such as IP source and destination address, port numbers, etc. The flows may have separate destination addresses to reach each separate RAT (e.g., WLAN 508 and 3G 510) of the WTRU 502, or in alternative embodiments, a WTRU 502 may utilize the same IP address for each of the multiple RATs (e.g., WLAN 508 and 3G 510).

The routing decisions made by the BWM entity 516 may be determined by the policy engine 514 and/or by the BWM entity 516 using policies stored at the policy engine 514. The routing decisions may be changed or configured based on various policies and/or parameters, such as load on the network, charging, etc. Each I-frame 504 may be a fully-specified picture, similar to a conventional static image file for example. Each P-frame and/or B-frame 506 may include a portion of the underlying image information, and may use less bits for transmission than an I-frame 504. In one embodiment, the BWM entity 516 may send I-frame(s) 504 on a more reliable link (e.g., the most reliable link available). Each I-frame 504 may be relatively larger (e.g., in terms of bits) than other frames, such as the P-frame(s) and/or B-frame(s) 506. The P-frame(s) and/or B-frame(s) 506 may be sent on a radio channel/link which may have less available bandwidth. The transmission of the I-frame 504 and/or the P-frame(s)/B-frame(s) 506 via their respective link(s) may be determined by various policies or parameters associated with quality of service, such as for example, bit error rate, packet error rate, SNR, available bandwidth, and/or the like. Failure or degradation of one of the links may minimally affect the video quality, if the I-frame(s) 504 make their way to the WTRU 502, and the video may be reconstructed using the I-frame(s) 504. Hence, enhanced error protection may be provided to the video traffic via BWA.

Figure 6:
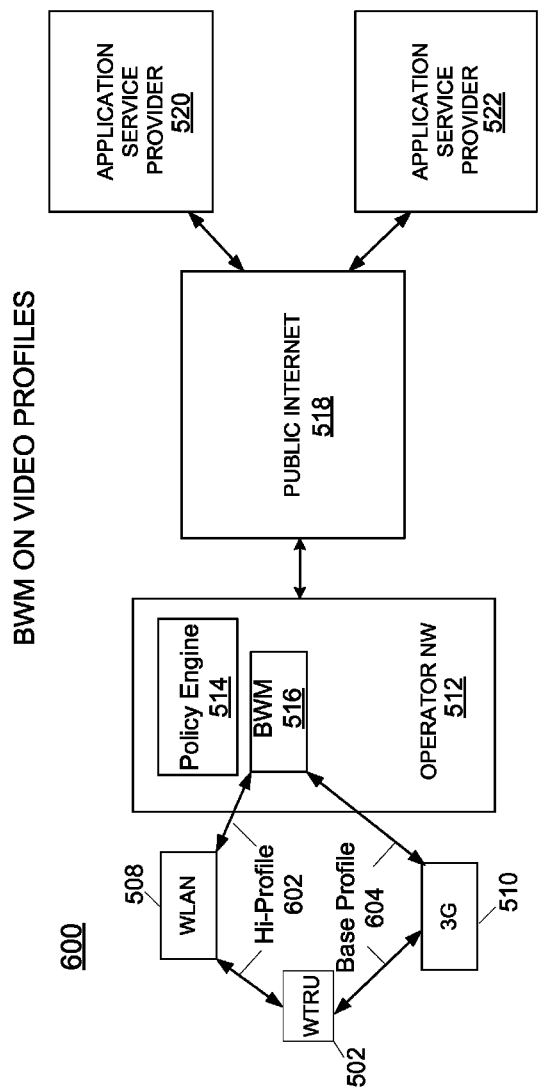
FIG. 6 is a block diagram illustrating an example of BWM using video profiles.

FIG. 6 is a diagram showing an example embodiment of a communications system 600 in which video may be transmitted according to video profiles using BWM entity 516. The BWM entity 516 may be configured to receive streaming video packet data from the application service provider 520 and/or application service provider 522 and send the streaming video packet data to the WTRU 502 according to one or more video profiles associated with the streaming video packet data. The BWM entity 516 may inspect the video traffic (e.g., in real-time), and may identify a profile of a video CODEC used, such as an H.264 payload or other CODEC for example. The video traffic may be sent over one or more RATs, such as via WLAN 508 and/or 3G network entity 510, based on the video profile assigned to the video packet data, or any portion thereof. For example, if the BWM entity 516 identifies a hi-profile sub-stream 602, the BWM entity 516 may route the hi-profile sub-stream 602 over the channel that has more bandwidth available, such as the Wi-Fi channel associated with the WLAN 508 for example. If the BWM entity 516 identifies a low or base-profile sub-stream 604, the BWM entity 516 may decide to route the low or base-profile sub-stream 604 via a channel that may have less bandwidth available or relatively limited bandwidth, such as the 3G channel associated with 3G entity 510 for example.

The profile routing decisions made by the BWM entity 516 may be determined by the policy engine 514 and/or the BWM entity 516 using policies stored at the policy engine 514. For example, the transmission of the hi-profile sub-stream 602 and/or the base-profile sub-stream 604 via their respective link(s) may be determined according to various policies or parameters. According to an example embodiment, the BWM entity 516 may send the hi-profile sub-stream 602 on a more reliable link than the base-profile sub-stream 604 based on the policies and/or parameters associated with the hi-profile sub-stream 602 and/or the base-profile sub-stream 604. The reliability of a link may be associated with the QoS provided by that link. For example, a more reliable link may be a link that may provide a greater QoS, such as through QoS guarantees (e.g., 3G link associated with 3G entity 510 where QoS guarantees may be made by the cellular network), greater available bandwidth, and/or any other parameter that may enable greater assurance of QoS for example. According to an example embodiment, one or more policies may be used to route a sub-stream via the cellular network entity (e.g., 3G entity 510)

if possible based on its available bandwidth, and may default to another network (e.g., a Wi-Fi network via WLAN 508) if transmission is not performed on the cellular network. The cellular network may be preferred because of its reliability, such as its QoS guarantees for example.

According to an example embodiment, the video content may be transmitted based on a video content nature profile, in which the transmission of the video content may depend on the nature of the video content itself. For example, high-motion video (e.g., including dance or sports content) may be transmitted via a higher bandwidth medium (e.g., Wi-Fi) and/or static or low-motion video (e.g., talk shows or news broadcasts) may be transmitted via a lower bandwidth medium (e.g., cellular network) since they may use relatively less bandwidth. Alternatively, or additionally, the routing decisions may be based on price, quality, time of day, type of video stream, and/or traffic congestion circumstances in the operator network for example.

Figure 7:
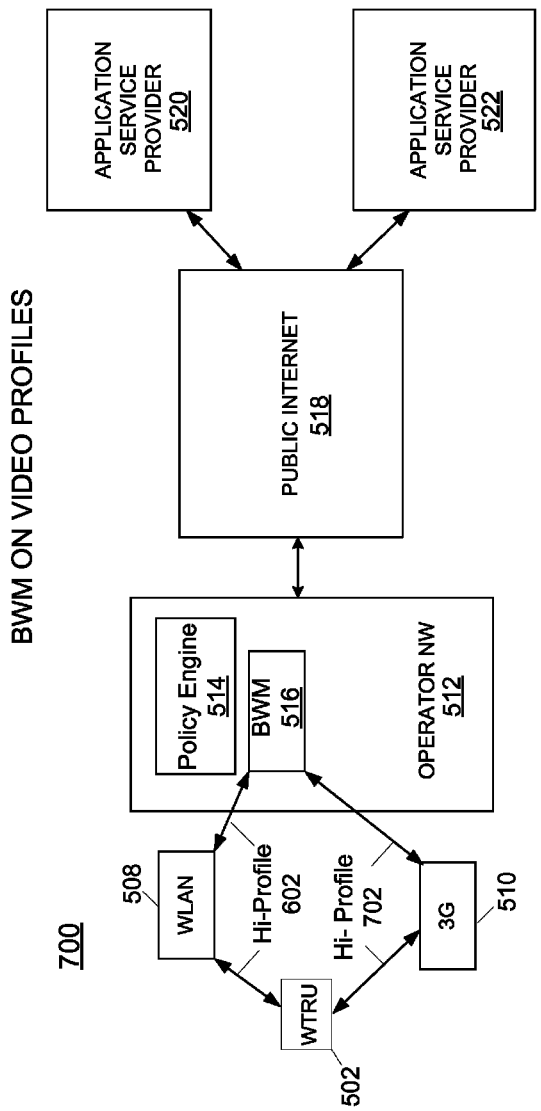
FIG. 7 is a block diagram illustrating another example of bandwidth aggregation ("BWA") using video profiles.

FIG. 7 is a diagram showing an example embodiment of a communications system 700 in which video may be transmitted according to video profile versions using BWA. While FIG. 7 illustrates an example of a video profile version being transmitted using BWA, video/video sub-streams having other characteristics may be similarly transmitted using BWA. The BWM entity 516 may be configured to receive streaming video packet data from the application service provider 520 and/or application service provider 522 and send the streaming video packet data to the WTRU 502 using BWA. As illustrated in FIG. 7, the BWM entity 516 may inspect the video traffic (e.g., H.264 video) and may detect the hi-profile sub-stream 602, 702 for example. According to other example embodiments, the video sub-stream may be a baseline or medium profile sub-stream, or any other profile version or characteristic of a video sub-stream for example. BWA may be performed (e.g., dynamically) by the BWM entity 516 to choose a combined pipe for the hi-profile sub-stream 602, 702, as it may use relatively more bandwidth than other profile sub-streams for example. For the hi-profile sub-stream 602, 702, channels may be aggregated to address the throughput requirements. For example, the hi-profile sub-stream 602, 702 may be sent via a Wi-Fi channel associated with WLAN 508 and a 3G channel associated with 3G entity 510. According to certain policies that may be implemented, such aggregation may not be performed for other video (e.g., H.264 video), for example, using baseline or other profile versions. The BWM entity 516 may determine (e.g., dynamically) the profile and may make policy adjustments in real-time. The policy decisions may be made via the policy engine 514 and/or policies stored at the policy engine 514.

Various video CODEC formats, such as SVC (e.g., which may be used in Enterprise Video Conferencing systems) for example, may be implemented in the mobile domain. SVC may be an extension/appendix to H.264/AVC formats. SVC may enable the encoding of a high-quality video bitstream that may include one or more subset video bitstreams. A subset video bitstream may be derived by dropping packets from the larger video to reduce the bandwidth used for the subset bitstream. Each subset video bitstream may be decoded with a complexity and/or reconstruction quality similar to that achieved using H.264/MPEG-4 AVC with the same quantity of data as in the subset video bitstream for example. SVC may use scalable profiles, such as a scalable baseline profile, a scalable high profile, and/or a scalable high intra profile. Scalable video profiles may be similar to other video profiles (e.g., H.264 video profiles), but they may use relatively higher bandwidth since they may carry a small overhead about the relationship to the subsequent SVC layer.

Depending on the policy and/or priority assigned to a profile, different profiles may be assigned to a different RAT. According to an example embodiment, the BWM entity 516 may send the scalable-baseline profile via a relatively more reliable available link (e.g., Wi-Fi when reliability is based on bandwidth), the scalable-high profile using a relatively less reliable link (e.g., 3G when reliability is based on bandwidth), and/or the scalable-high-intra profile using a relatively less reliable link (e.g., TVWS spectrum when reliability is based on bandwidth). In this embodiment, the higher quality video profiles may be given a lower priority, as transmission of the baseline profile may be preferred to allow transmission and of the video with the quality of the video having a lesser priority. According to an alternative embodiment in which higher quality video may be assigned a relatively higher priority, the BWM entity 516 may send the scalable-high profile via a relatively more reliable available link (e.g., Wi-Fi when reliability is based on bandwidth), the scalable-baseline profile using a relatively less reliable link (e.g., 3G when reliability is based on bandwidth), and/or the scalable-high-intra profile using a relatively less reliable link (e.g., TVWS spectrum when reliability is based on bandwidth).

Figure 8:
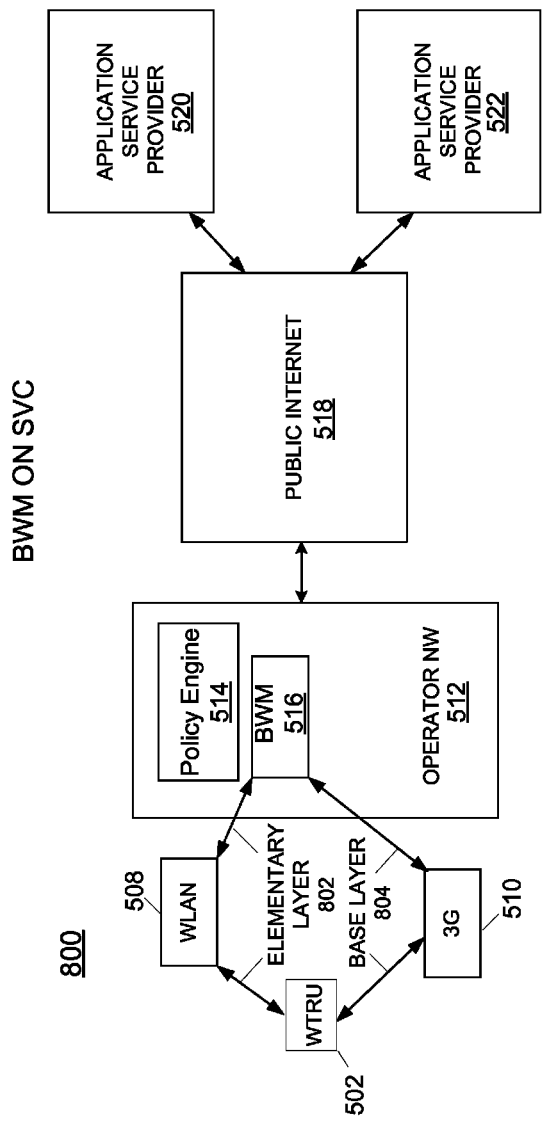
FIG. 8 is a block diagram illustrating an example BWM using Scalable Video Coding ("SVC").

FIG. 8 is a diagram showing an example embodiment of a communications system 800 in which video may be transmitted according to SVC video profiles/video profile layers using BWM entity 516. The BWM entity 516 may be configured to receive streaming video packet data from the application service provider 520 and/or application service provider 522 and send the streaming video packet data to the WTRU 502 using different RATs for different SVC video profiles/video profile layers. The BWM entity 516 may inspect the video traffic and may determine which of the scalable profiles an SVC encoded stream may use. For example, the BWM entity 516 may identify the elementary layer (e.g., main profile layer) sub-stream 802 and/or the base-layer (e.g., base profile layer) sub-stream 804. The video traffic may be sent over one or more RATs, such as WLAN 508 and/or 3G network entity 510, based on the SVC video profile assigned to each sub-stream. For example, the BWM entity 516 may send one or more of the sub-streams comprising an SVC video profile that that may use more bandwidth (e.g., scalable-baseline profile) via a more reliable link, such as a Wi-Fi link associated with WLAN 508 for example, and may decide to send one or more of the other SVC video profile layers on a link having lower available bandwidth. The link on which the other profile layers are sent may depend, for example, on the channel strength of each radio access layer.

According to an example embodiment, as illustrated in FIG. 8, the BWM entity 516 may transmit the elementary layer (e.g., main profile layer) sub-stream 802 to the WTRU 502 via the WLAN 508 and may send the base layer (e.g., base profile layer) sub-stream 804 via the 3G entity 510. The SVC profile routing decisions may be determined by the policy engine 514 and/or the BWM entity 516 using policies stored at the policy engine 514. The transmission of the elementary layer (e.g., main profile layer) sub-stream 802 and/or the base layer (e.g., base profile layer) sub-stream 804 via their respective link(s) may be determined by various policies or parameters as described herein. For example, the transmission may be determined based on policies for scalable and/or non-scalable profiles.

According to another embodiment, the BWM entity 516 may determine, via packet inspection for example, whether the streaming video includes multiple reference frames ("MRF"). When so identified, the BWM entity 516 may decide that the particular video may be routed over a lower bandwidth channel, because the video encoded via MRF may require less bandwidth as compared to other video, such as video not encoded via MRF for example.

Figure 9:
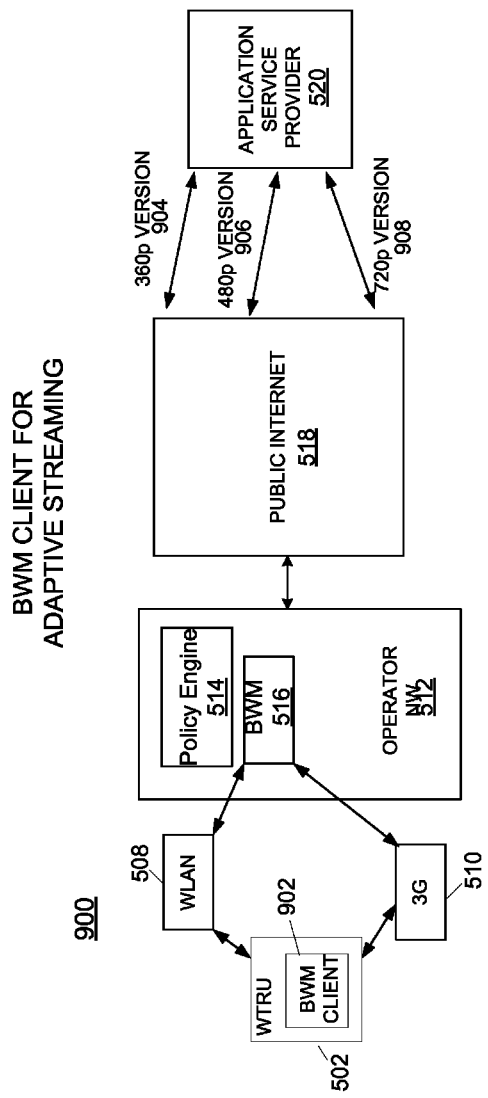
FIG. 9 is a block diagram illustrating an example of BWM with adaptive video streaming.

FIG. 9 is a diagram showing an example embodiment of a communications system 900 in which video may be transmitted using adaptive http video streaming ("adapted video streaming"). Adapted video streaming may be implemented in video delivery systems that implement an http network. Adapted video streaming may be used to detect an available bandwidth and/or WTRU capacity (e.g., in real time) and adjust the quality of the video stream accordingly. To facilitate delivery of adapted video streams, a video may be encoded in different formats, such as 360p version 904, 480p version 906, 720p version 908, and/or any other version comprising another video format for example. Each format may be kept separately (e.g., at the application service provider 520), and/or may be served based on capabilities of the WTRU 502 and/or the video client application thereon. The BWM entity 516 may be configured to receive one or more of the encoded formats from the application service provider 520 and send the streaming video packet data to the WTRU 502. Using adapted video streaming, the WTRU 502 and/or the video client application may switch (e.g., dynamically) between different encoded content to upgrade or downgrade the quality of the streaming session. For example, the client application may switch between 360p version 904, 480p version 906, and/or 720p version 908. This may prevent stalling and/or re-buffering. The BWM entity 516 may inspect the video traffic (e.g., in real-time), and may identify the version of the video content used. The video traffic may be sent over one or more RATs, such as via WLAN 508 and/or 3G network entity 510, based on the identified characteristic (e.g., profile, frame type, and/or similar video encoding structure) parameters as described herein.

The WTRU 502 may include a BWM client 902. The BWM client 902 may be in communication with the BWM entity 516 and may be configured to enable BWM and/or BWA. For example, with the help of the BWM entity 516, the BWM client 902 of the WTRU 502 may detect and/or request a higher version or resolution of the video by aggregating the available bandwidth. The BWM client 902 may monitor the bandwidth available for a streaming session. The BWM client 902 may detect that bandwidth available for the streaming session may not be adequate for an adaptive streaming session, and the BWM client 902 may decide to trigger BWA. For example, the BWM client 902 may trigger BWA at the BWM server 516. BWA may enable the aggregation of the bandwidth available via the WLAN 508 and 3G entity 510 for example. In this way, the BWM client 902 may prevent switching between different encoded formats frequently. Moreover, the BWM client 902 and/or the BWM entity 516 may enable, via BWA, higher throughput, which may enable the BWM entity 516 to request and deliver higher quality encoded content.

FIG. 10 is a diagram showing an example embodiment of a communications system 1000 for performing BWM for embedded web video using the BWM entity 516. The embodiments described herein may be implemented using browser-based video. For a web page or other application that has embedded video, video source inspection may be performed. According to an example embodiment, a BWM entity 516 may receive a web page having embedded HTML video (e.g., constructed via HTML5). The BWM entity 516 may identify the video streaming format of the embedded video, such as by the video tag in the video content (e.g., HTML5 content). In response, the BWM entity 516 may assign a low-latency channel (e.g., a Wi-Fi channel associated with WLAN 508) for serving the embedded video, while serving the web page on another channel (e.g., a 3G channel associated with 3G entity 510).

BWM entity 516 may detect the video format and may decide to implement BWM and/or BWA based on the detected format, the available bandwidth at the one or more RATs, and/or one or more policies or parameters described herein. The routing decisions may be determined by the policy engine 514 and/or the BWM entity 516 using policies stored at the policy engine 514. Identifying the video tag may enable the BWM entity 516 to make the decision as to whether BWA may be performed.

Embodiments are described herein for aggregating bandwidth for interactive video services. Various forms of video service signaling may be implemented. For a conservational video service, such as 2-way video calling or multi-party video conferencing, data transfer and bandwidth for such a service may be asynchronous. For a basic video call, one of the parties may be on hold or, in terms of resolution characteristics, there may be differences. For example, one WTRU may support HD resolution, whereas another may support SD resolution. To facilitate BWA and/or BWM in response to such differences, the BWM entity 516 may use video call signaling information, CODEC, and/or frame rate/resolution parameters to determine which combination (s) of RATs to allocate each video sub-stream.

Various forms of video service QoS policies may be implemented. The BWM entity 516 and/or the policy engine 514 may assign intelligent radio link traffic steering policies depending on downlink and/or uplink requirements of a service. For example, for 2-way video calling, if both sides have identical frame rate and resolution parameters, the BWM entity 516 may not make a distinction in terms of BWA and/or BWM for downlink and uplink. However, when one or more of such parameters are different, the BWM entity 516 may assign different priorities in terms of using different RATs for uplink and/or downlink, such as, for example, using 3G entity 510 or WLAN 508 for uplink, and using WLAN 508 for downlink.

As another example, for a video service such as multi-party video conferencing, the BWM entity 516 may assign and/or use Wi-Fi for downlink since the video stream for the downlink may include networked mixed video of multiple users. The BWM entity 516 may assign and/or use cellular network communications (e.g., 3G or LTE) to upload the content from the WTRU 502. The policies and/or parameters that the BWM entity 516 and/or policy engine 514 may pay attention to may depend on and/or change based on QoS policies (e.g., of a service provider or other policy owner) for the particular service. For example, if the QoS policy is to minimize the latency of the video call service (e.g., less than about 150 ms), the BWM entity 516 may aggregate the available channels.

As described herein, multi-stream services may be transmitted over multiple IP networks. Multiple connections may be utilized to support video and/or interactive services, as described herein for example. One type of transport for such services may be that of IP networks. Data may be partitioned between multiple IP connections. The BWM entity 516 may determine which data is routed and/or forwarded to each connection.

In one example, video application sub-flows may be partitioned, as described herein for example. For each application sub-flow, a sub-set of available IP interfaces may be chosen for transmission. Each of the IP interfaces may define an IP connection (e.g., an IP source address and an IP destination address). Multiple application flows or sub-flows may share the same IP connections. In an example embodiment, no two application sub-flows may share a single IP datagram. Synchronization may be performed for data that may be sent over multiple IP connections.

Application sub-sessions may be managed using Independent L4 flows. One way for independent management of video sub-sessions (e.g., I/P/B flows) may be to partition them, and label each partition as a sub-flow that may be managed independently in an advanced multi-connection terminal (e.g., WTRU 502). For example, DPI and/or an ASIF, as described herein, may be used. A sniffer function, that may be in conjunction with an ASIF or associated with a standard socket interface for example, may be used. Other advanced multi-connection terminals/WTRUs may be used, as well.

Data provided by the video application via a socket may be partitioned as described herein. Once the data is partitioned, each sub-session may be labeled as a separate IP flow. The labeling of the separate IP-flows may be accomplished by associating each sub-flow with a different IP 5-tuple (e.g., transport protocol, source/destination IP address and source/destination port). According to an example embodiment, a different 5-tuple may be automatically generated for IP flows because of different characteristics associated with these flows. In the case of video-sub-flow mapping to IP flows, this may not be sufficient. Accordingly, one or more other techniques may be used. For example, a different socket may be opened for each sub-flow, which may result in using different WTRU source ports, and which may create a unique 5-tuple having a unique source port. In another example, an ASIF may provide an application the capability to do so with a single advanced socket call, or the application may manage this operation itself by opening multiple sockets. In another example embodiment, the WTRU may maintain multiple IP address and assign a different source IP address to different sub-flows, which may create a unique 5-tuple for each flow. According to another example, the application server may be addressable using multiple IP addresses and different destination IP addresses from this pool of application server IP addresses may be used to differentiate sub-flows with a unique 5-tuple. Differentiating the separate IP flows may be accomplished by assigning each sub-session (e.g., flows of I/P/B frames) a different IP address. Other portions of the IP 5-tuple may be the same for the sub-sessions. For example, each sub-session may use the same destination IP address, transport protocol, destination port, and/or source port. Multi-connection terminal implementations may support differentiating the separate IP flows by assigning each sub-sessions different IP addresses.

According to another embodiment, application sub-sessions may be managed using a multi-connection transport layer ("L4") protocol (e.g., UDP and TCP). Such a protocol may be capable of handling multiple connections. When such a protocol or like-type protocol is used, a transport ("multi-connection-transport") port may be opened for each application sub-flow. This multi-connection-transport port may be similar to a TCP port, in that, a unique port number may be assigned to each application sub-flow, so that such sub-flow may be uniquely identified for example. Unlike the TCP or other port that may be associated with a single source/destination pair, the multi-connection-transport port may be associated with multiple source/destination pairs.

The procedure for establishing, maintaining, and/or tearing down connections via the multi-connection-transport port may be similar to the procedures for TCP/IP connections. The data from each multi-connection-transport port may arrive at each IP source with an indication of the desired destination address. This data may be split into multiple IP datagrams, and may not be mixed with any other data for example. The transport protocols at the destination may provide reassembly and/or retransmission services.

To partition the video sub-streams and/or prepare the video sub-streams for mapping to an application sub-flow, a traffic analysis function may be implemented. A DPI or a sniffer function, as described herein for example, may be examples of such traffic analysis functions. This function may also reside within the L4 protocol and may be used to examine traffic for sub-flows within a particular flow. Once this is done, the partitioned sub-flows may be mapped to separate sub-flows of and L4 protocol (e.g., MPTCP). Different video streams may be mapped to different L4 protocol sub-flows to address synchronization for application sub-flows. In some instances, the application itself may be able to synchronize the sub-flows. However, in some cases, the application may expect that the transport protocol provides some synchronization. For example, a video application operating over TCP may expect that its frames be delivered in order, because TCP may provide such service. However, if the video stream is partitioned into I/P/B application sub-flows, while each application sub-flow may be delivered in order (e.g., which may be a service of the multi-connection transport protocols), the sub-streams may no longer be synchronized. An application flow re-assembly may be performed to enable synchronization. This application flow re-assembly may reside above the transport layer protocol, and may work in conjunction with DPI (or another packet inspection mechanism) and partitioned applications sub-flows. For example, as application flows are partitioned, the application sub-flows may be marked for synchronization, using mechanisms such as frame numbers of time stamps for example. At the destination, the markings may be used to synchronize the application sub-flows (e.g., where each sub-flow may already be in order because the transport protocol may provide such service). The synchronization may be accomplished by aligning the sub-flows, and/or delaying the early arriving flows to wait for the later ones.

Another example embodiment may include aligning some sub-flows pursuant to application directions. For example, a video receiver may request its sub-flow synchronization module to align some sub-flows (e.g., the I and P sub-flows), and deliver others (e.g., the B sub-flow) if this may be performed without introducing additional delay into the overall video stream. This option may be implemented for interactive application (e.g., video).

Although features and elements are described above in particular combinations, each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory ("ROM"), a random access memory ("RAM"), a register, cache memory, semiconductor memory devices, magnetic media such as internal hard disks and removable disks, magneto-optical media, and optical media such as CD-ROM disks, and digital versatile disks ("DVDs"). A processor in association with software may be used to implement a radio frequency transceiver for use in a WTRU, UE, terminal, base station, RNC, or any host computer.

Moreover, in the embodiments described herein, processing platforms, computing systems, controllers, and other devices containing processors may be implemented. These devices may contain at least one Central Processing Unit ("CPU") and memory. Reference to acts and symbolic representations of operations or instructions may be performed by the various CPUs and memories. The acts and symbolically represented operations or instructions may include the manipulation of electrical signals by the CPU. An electrical system may represent data bits that may cause a resulting transformation or reduction of the electrical signals and the maintenance of data bits at memory locations in a memory system to thereby reconfigure or otherwise alter the CPU's operation, as well as other processing of signals. The memory locations where data bits are maintained may be physical locations that may have particular electrical, magnetic, optical, or organic properties corresponding to or representative of the data bits. The exemplary embodiments are not limited to the above-mentioned platforms or CPUs and other platforms and CPUs may support the described embodiments.

The data bits may be maintained on a computer readable medium including magnetic disks, optical disks, and any other volatile (e.g., RAM) or non-volatile (e.g., ROM) mass storage system readable by the CPU. The computer readable medium may include cooperating or interconnected computer readable medium, which may exist (e.g., exclusively) on the processing system or may be distributed among multiple interconnected processing systems that may be local or remote to the processing system. The exemplary embodiments are not limited to the above-mentioned memories and other platforms and memories may support the described embodiments.

What is claimed is:

1. A bandwidth management (BWM) server, residing at a mobile core network, that is configured to receive, via an internet connection, packets of HTML traffic from at least one of a wireless transmit/receive unit (WTRU) or an application service provider device and transmit video from the mobile core network via a plurality of radio access technologies (RATs), the BWM server comprising:
    a traffic detection function configured to:
        receive the packets of HTML traffic from the at least one of the WTRU or the application service provider device,
        inspect the packets of HTML traffic,
        identify an existence of a video stream and at least one video streaming format of the video stream based on a video tag in the packets of HTML traffic; and
    a processor configured to determine whether to implement bandwidth aggregation (BWA) to simultaneously transmit the video stream using the plurality of RATs based on the at least one video streaming format indicated by the video tag, wherein the determination is performed to meet a policy for managing a bandwidth associated with the at least one video streaming format; and
    at least one transmitter configured to transmit the video stream using the plurality of RATs.

2. The BWM server of claim 1, wherein the plurality of RATs comprise an interface for performing communications using at least one of a licensed wireless spectrum or an unlicensed wireless spectrum, and wherein the unlicensed wireless spectrum includes at least one of a frequency of any of an industrial, scientific, and medical (ISM) radio frequency band; an unlicensed national information infrastructure (U-NII) radio frequency band; or a television white space (TVWS) spectrum.

3. The BWM server of claim 1, wherein the plurality of RATs comprises a first RAT and a second RAT, and wherein the first RAT has a greater relative bandwidth than the second RAT.

4. The BWM server of claim 1, wherein the video stream comprises intra-coded-picture frames (I-Frames), and wherein the video stream comprises at least one of pre-dicted-picture frames (P-Frames) or bi-predictive-picture frames (B-Frames).

5. The BWM server of claim 1, wherein the video stream is a scalable video coding (SVC) stream that comprises different layers.

6. The BWM server of claim 1, wherein the plurality of RATs comprise a first RAT and a second RAT, and wherein the first RAT is configured for Wi-Fi communication and the second RAT is configured for cellular communication.

7. The BWM server of claim 1, wherein the policy is based on at least one of a service requirement, a level of a quality of service, a price, a price range, a video quality, a time of day, a type of video stream, a type of video content, or network traffic congestion circumstances.

8. The BWM server of claim 1, wherein the BWM server resides in at least one of a gateway GPRS support node (GGSN), a packet data network (PDN) gateway (GW), or an access service network (ASN) GW.

9. The BWM server of claim 1, wherein the traffic detection function comprises a deep packet inspection (DPI) function that identifies the existence of the video stream and the at least one video streaming format of the video stream based on the video tag in the packets of HTML traffic using deep packet inspection.

10. The BWM server of claim 1, wherein the plurality of RATs comprise at least one of an RAT for Wi-Fi communication, an RAT for cellular communication, an RAT for Wi-MAX communication, or an RAT for television white space (TVWS) communication.

11. The BWM server of claim 1, wherein the packets of HTML traffic comprise HTML 5 content.

12. A method for transmitting video from a mobile core network via a plurality of radio access technologies (RATs), the method comprising:
    receiving, via an internet connection, packets of HTML traffic from at least one of a wireless transmit/receive unit (WTRU) or an application service provider device;
    inspecting the packets of HTML traffic;
    identifying an existence of a video stream and at least one video streaming format of the video stream based on a video tag in the packets of HTML traffic;
    determining whether to implement bandwidth aggregation (BWA) to simultaneously transmit the video stream using the plurality of RATs based on the at least one video streaming format indicated by the video tag, wherein the determination is performed to meet a policy for managing a bandwidth associated with the at least one video streaming format; and
    transmitting the video stream using the plurality of RATs when indicated by the video tag.

13. The method of claim 12, wherein the plurality of RATs comprise an interface for performing communications using at least one of a licensed wireless spectrum or an unlicensed wireless spectrum, and wherein the unlicensed wireless spectrum includes at least one of a frequency of any of an industrial, scientific, and medical (ISM) radio frequency band; an unlicensed national information infrastructure (U-NII) radio frequency band; or a television white space (TVWS) spectrum.

14. The method of claim 12, wherein the plurality of RATs comprises a first RAT and a second RAT, and wherein the first RAT has a greater relative bandwidth than the second RAT.

15. The method of claim 12, wherein the video stream comprises intra-coded-picture frames (I-Frames), and wherein the video stream comprises at least one of pre-dicted-picture frames (P-Frames) or bi-predictive-picture frames (B-Frames).

16. The method of claim 12, wherein the video stream is a scalable video coding (SVC) stream that comprises different layers.

17. The method of claim 12, wherein the plurality of RATs comprise a first RAT and a second RAT, and wherein the first RAT is used for Wi-Fi communication and the second RAT is used for cellular communication.

18. The method of claim 12, wherein the policy is based on at least one of a service requirement, a level of a quality of service, a price, a price range, a video quality, a time of day, a type of video stream, a type of video content, or network traffic congestion circumstances.

19. The method of claim 12, wherein the method is performed by a bandwidth management entity that resides in at least one of a gateway GPRS support node (GGSN), a packet data network (PDN) gateway (GW), or an access service network (ASN) GW in the mobile core network.

20. The method of claim 12, wherein the existence of the video stream and the at least one video streaming format of the video stream are identified based on the video tag in the HTML traffic using a deep packet inspection.

21. The method of claim 12, wherein the plurality of RATs comprise at least one of an RAT for Wi-Fi communication, an RAT for cellular communication, an RAT for Wi-MAX communication, or an RAT for television white space (TVWS) communication.

22. The method of claim 12, wherein the packets of HTML traffic comprise HTML 5 content.

* * * * *